United States Patent
Suzuki et al.

(10) Patent No.: US 10,320,618 B2
(45) Date of Patent: Jun. 11, 2019

(54) NETWORK SYSTEM, NETWORK MANAGEMENT METHOD, AND NETWORK MANAGEMENT DEVICE

(71) Applicant: HITACHI, LTD., Tokyo (JP)

(72) Inventors: Toshiaki Suzuki, Tokyo (JP); Hayato Hoshihara, Tokyo (JP); Taro Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 39 days.

(21) Appl. No.: 15/471,100

(22) Filed: Mar. 28, 2017

(65) Prior Publication Data

US 2017/0288973 A1 Oct. 5, 2017

(30) Foreign Application Priority Data

Mar. 29, 2016 (JP) .................. 2016-065142

(51) Int. Cl.
*H04L 12/24* (2006.01)
*H04L 12/721* (2013.01)

(52) U.S. Cl.
CPC .......... *H04L 41/12* (2013.01); *H04L 41/0896* (2013.01); *H04L 45/124* (2013.01)

(58) Field of Classification Search
CPC .... H04L 41/0896; H04L 41/12; H04L 45/124
USPC ....................................................... 370/254
See application file for complete search history.

(56) References Cited

U.S. PATENT DOCUMENTS

| | | | | |
|---|---|---|---|---|
| 2003/0201463 A1* | 10/2003 | Ikeda | .................. | G06F 17/5068 257/200 |
| 2009/0323522 A1* | 12/2009 | Deguchi | ................. | H04L 41/08 370/228 |
| 2012/0014246 A1* | 1/2012 | Matsumoto | ......... | H04L 41/0803 370/221 |

FOREIGN PATENT DOCUMENTS

| | | |
|---|---|---|
| JP | 2010-011039 A | 1/2010 |
| JP | 2015-156546 A | 8/2015 |

* cited by examiner

*Primary Examiner* — Huy D Vu
*Assistant Examiner* — Nizam U Ahmed
(74) *Attorney, Agent, or Firm* — Volpe and Koenig, P.C.

(57) ABSTRACT

A network management device retains path information of paths as a list of node identifying information to identify nodes, the path information including information on paths sharing a link regarding a relation in which one path shares a link with another path. According to the information on paths sharing a link, the network management device determines a path setup timing for a path to be the same for a group of one or more paths that do not share a same link with the path and determines a different path setup timing for a group of one or more paths that share a same link with the path than the timing for the group including the path, and executes path setup via communication devices existing on paths constituting each group of paths as per path setup timing determined for each group.

6 Claims, 27 Drawing Sheets

FIG. 3

PATH SETUP MESSAGE PACKET 1800

| INPUT LABEL (1800a) | FORWARDING DESTINATION COMM. DEVICE IDENTIFIER (1800b) |
|---|---|
| #2 | #4 |

FIG. 4

DATA FORWARDING TABLE 1904

| INPUT LABEL (1904a) | OUTPUT PORT (1904b) |
|---|---|
| #2 | #4 |
| #6 | #1 |
| ⋮ | ⋮ |

FIG. 5

DEVICE AND CONNECTION PORT MAPPING TABLE 1908

| COMM. DEVICE IDENTIFIER (1908a) | PORT (1908b) |
|---|---|
| #2 | #1 |
| #6 | #2 |
| #8 | #3 |
| #12 | #4 |
| ⋮ | ⋮ |

NETWORK MANAGEMENT SERVER

FIG. 7A
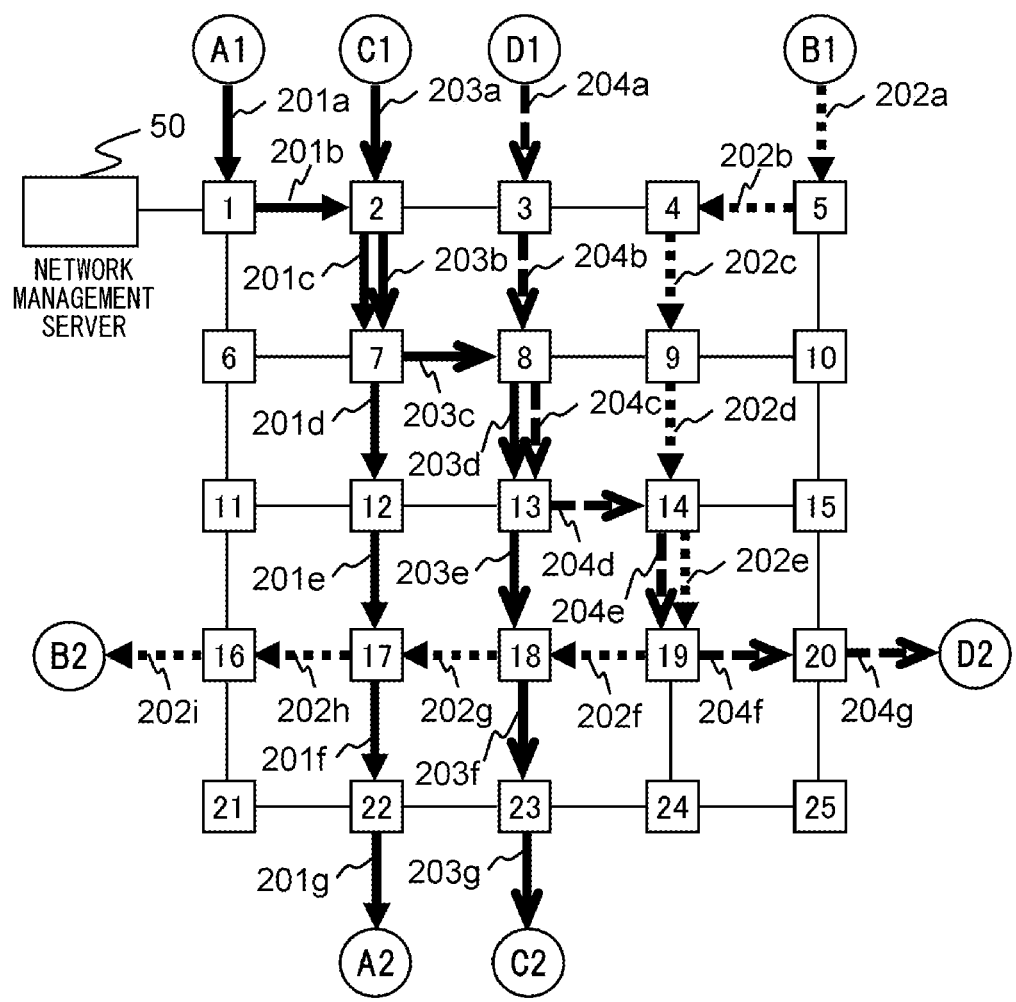
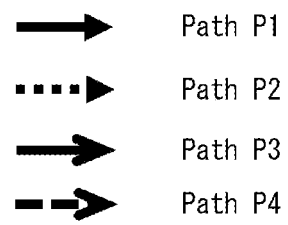

FIG. 7C
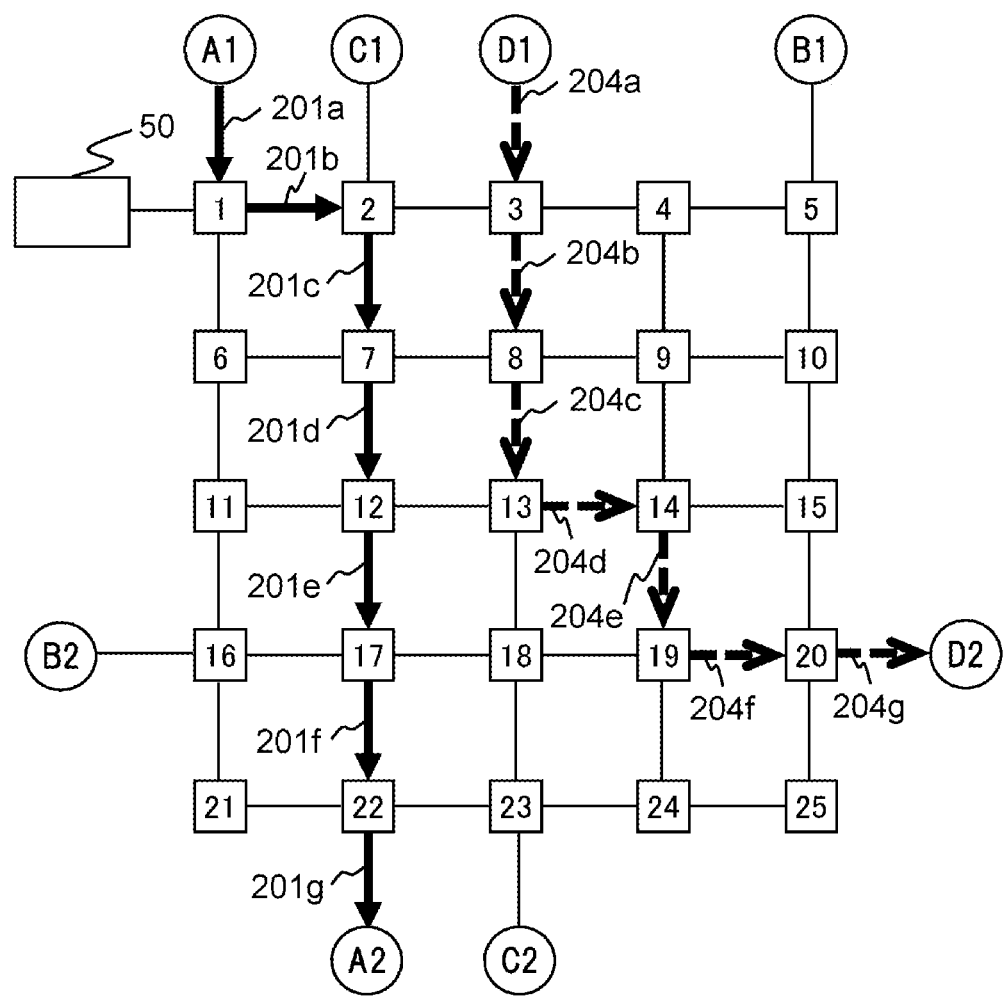
 Path P1
 Path P4

FIG. 8A

PATH SETUP MANAGEMENT TABLE (before setup)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Link (406) | Setup Timing (407) |
|---|---|---|---|---|---|---|---|
| 1 (411) | P1 | A1 | A2 | 1, 2, 7, 12, 17, 22 | 6 | P3 | T1 |
| 2 (412) | P2 | B1 | B2 | 5, 4, 9, 14, 19, 18, 17, 16 | 8 | P4 | T2 |
| 3 (413) | P3 | C1 | C2 | 2, 7, 8, 13, 18, 23 | 6 | P1, P4 | T3 |
| 4 (414) | P4 | D1 | D2 | 3, 8, 13, 14, 19, 20 | 6 | P2, P3 | T4 |

FIG. 8B

PATH SETUP MANAGEMENT TABLE (sorted in descending order of path length)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Link (406) | Setup Timing (407) |
|---|---|---|---|---|---|---|---|
| 1 (421) | P2 | B1 | B2 | 5, 4, 9, 14, 19, 18, 17, 16 | 8 | P4 | T2 |
| 2 (422) | P1 | A1 | A2 | 1, 2, 7, 12, 17, 22 | 6 | P3 | T1 |
| 3 (423) | P3 | C1 | C2 | 2, 7, 8, 13, 18, 23 | 6 | P1, P4 | T3 |
| 4 (424) | P4 | D1 | D2 | 3, 8, 13, 14, 19, 20 | 6 | P2, P3 | T4 |

FIG. 8C

PATH SETUP MANAGEMENT TABLE (sorted by inter-path distance)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Link (406) | Setup Timing (407) |
|---|---|---|---|---|---|---|---|
| 1 (431) | P2 | B1 | B2 | 5, 4, 9, 14, 19, 18, 17, 16 | 8 | P4 | T2 |
| 2 (432) | P3 | C1 | C2 | 2, 7, 8, 13, 18, 23 | 6 | P1, P4 | T3 |
| 3 (433) | P1 | A1 | A2 | 1, 2, 7, 12, 17, 22 | 6 | P3 | T1 |
| 4 (434) | P4 | D1 | D2 | 3, 8, 13, 14, 19, 20 | 6 | P2, P3 | T4 |

FIG. 8D

PATH SETUP MANAGEMENT TABLE (timing fixed)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Link (406) | Setup Timing (407) |
|---|---|---|---|---|---|---|---|
| 1 (441) | P2 | B1 | B2 | 5, 4, 9, 14, 19, 18, 17, 16 | 8 | P4 | T1 |
| 2 (442) | P3 | C1 | C2 | 2, 7, 8, 13, 18, 23 | 6 | P1, P4 | T1 |
| 3 (443) | P1 | A1 | A2 | 1, 2, 7, 12, 17, 22 | 6 | P3 | T2 |
| 4 (444) | P4 | D1 | D2 | 3, 8, 13, 14, 19, 20 | 6 | P2, P3 | T2 |

FIG. 9

INTER-PATH DISTANCE MANAGEMENT TABLE

| | List of Comm. Devs. On Path 2 (P2) | 5 | 4 | 9 | 14 | 19 | 18 | 17 | 16 | Total |
|---|---|---|---|---|---|---|---|---|---|---|
| 521 | Distance from Comm. Devs. On Path 2 (P2) To Path 1 (P1) | 3 | 2 | 2 | 2 | 2 | 1 | 0 | 1 | 13 |
| 522 | Distance from Comm. Devs. On Path 2 (P2) To Path 3 (P3) | 3 | 2 | 1 | 1 | 1 | 0 | 1 | 2 | 11 |

520

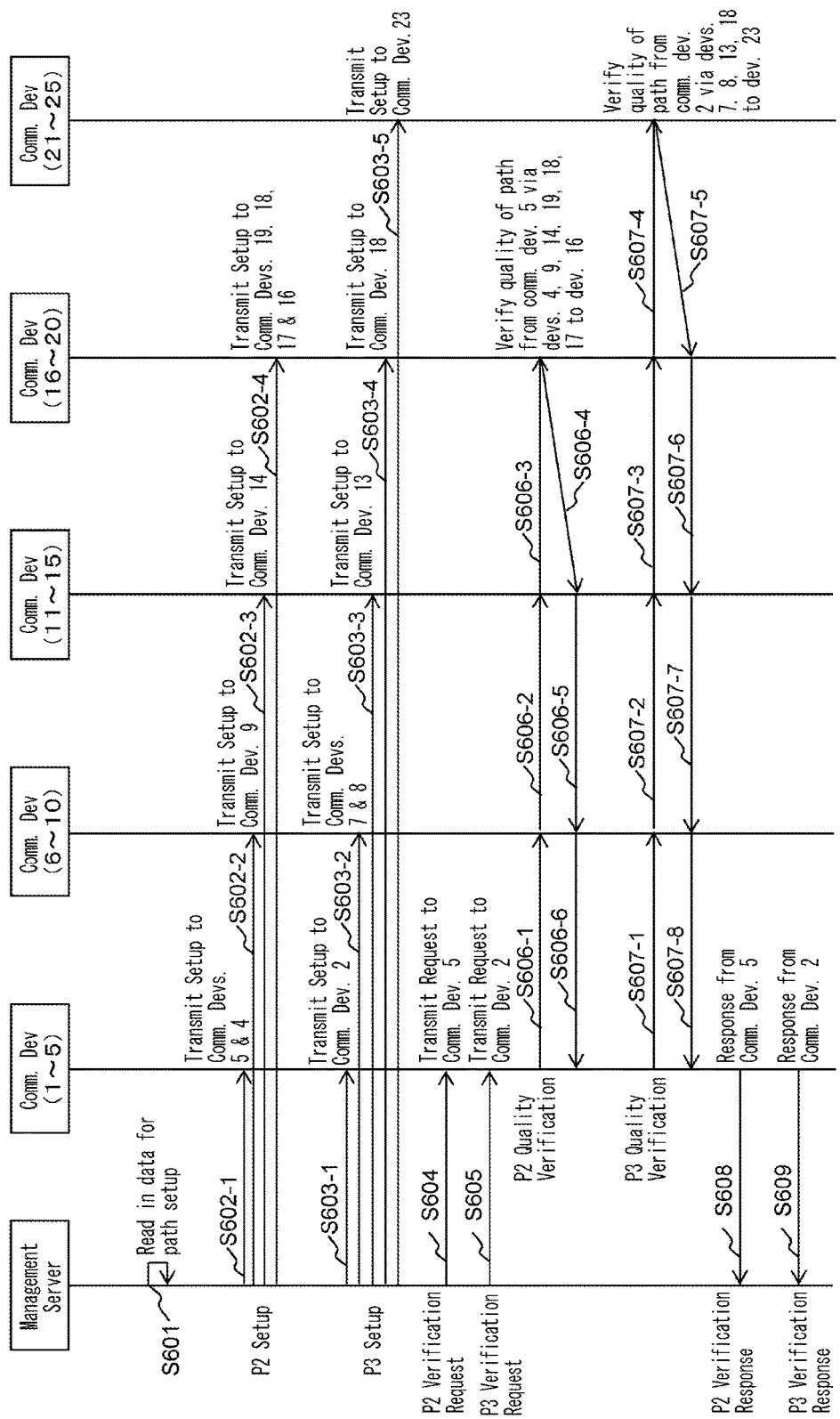

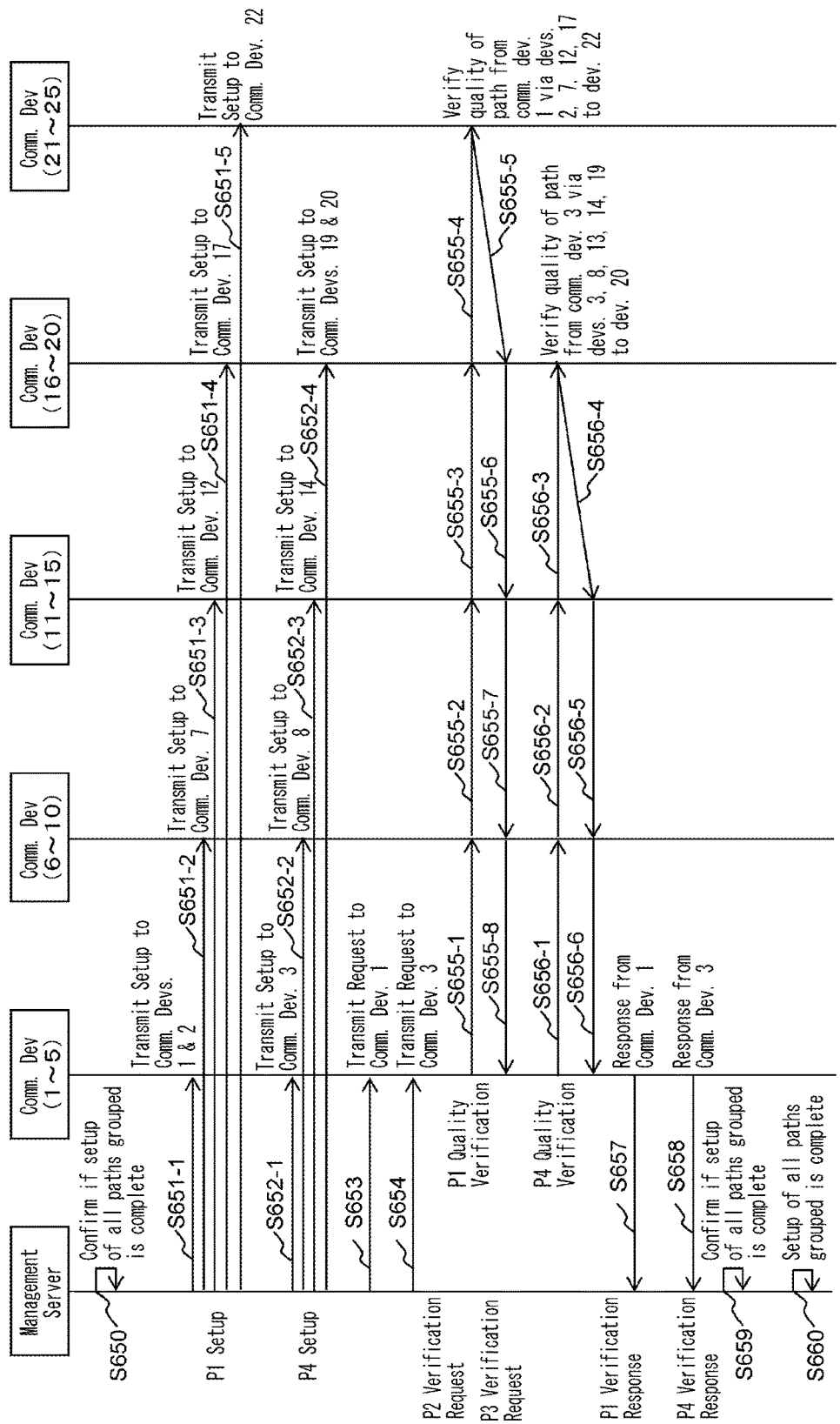

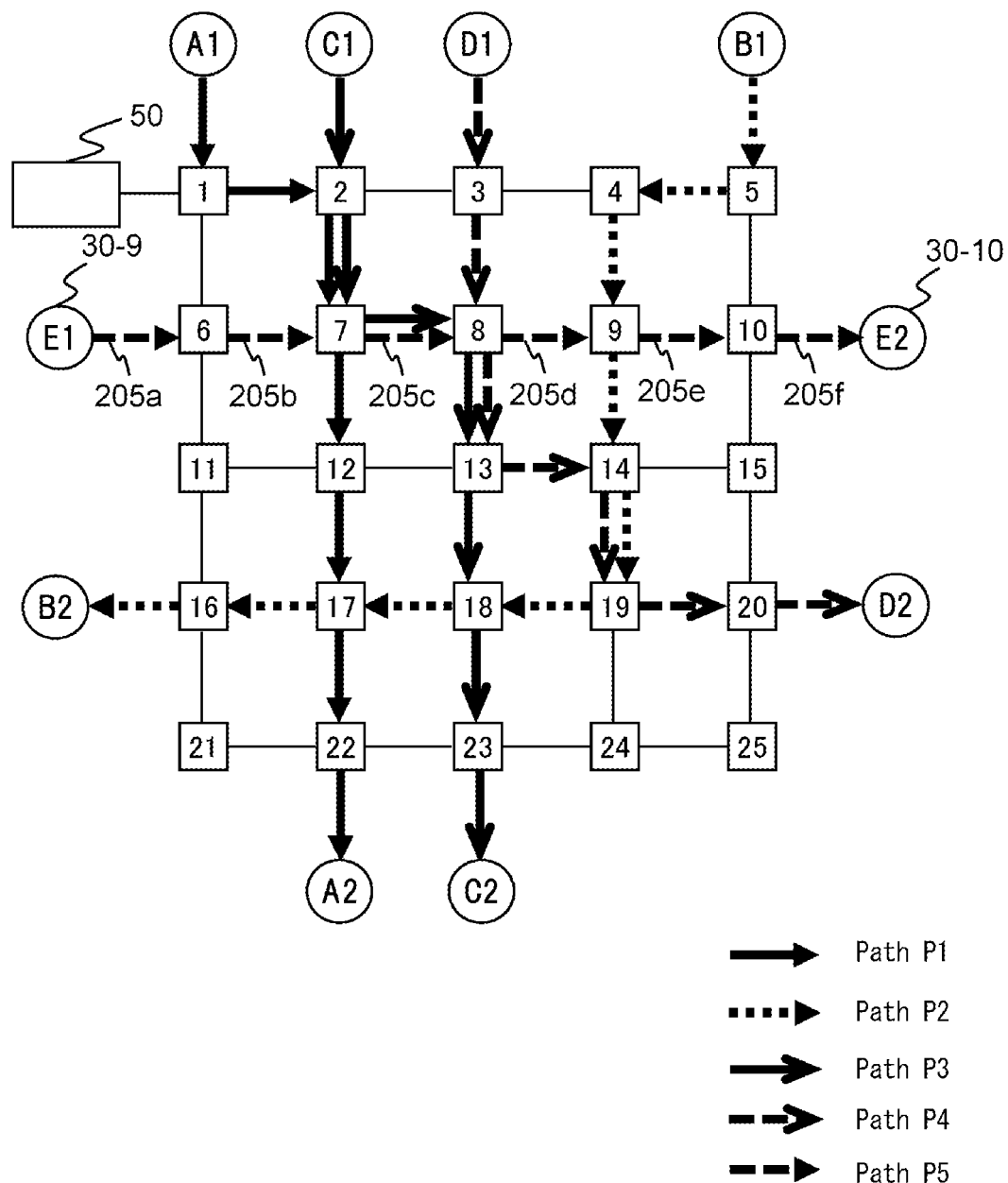

FIG. 16

PATH SETUP MANAGEMENT TABLE (timing fixed)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Link (406) | Setup Timing (407) | Upon Setup Completion (410) |
|---|---|---|---|---|---|---|---|---|
| 1 | P2 | B1 | B2 | 5, 4, 9, 14, 19, 18, 17, 16 | 8 | P4 | T1 | — |
| 2 | P3 | C1 | C2 | 2, 7, 8, 13, 18, 23 | 6 | P1, P4, P5 | T1 | — |
| 3 | P1 | A1 | A2 | 1, 2, 7, 12, 17, 22 | 6 | P3 | T2 | P3 |
| 4 | P5 | E1 | E2 | 6, 7, 8, 9, 10 | 5 | P3 | T2 | P3 |
| 5 | P4 | D1 | D2 | 3, 8, 13, 14, 19, 20 | 6 | P2, P3 | T3 | P2 |

(1201, 1202, 1203, 1204, 1205)

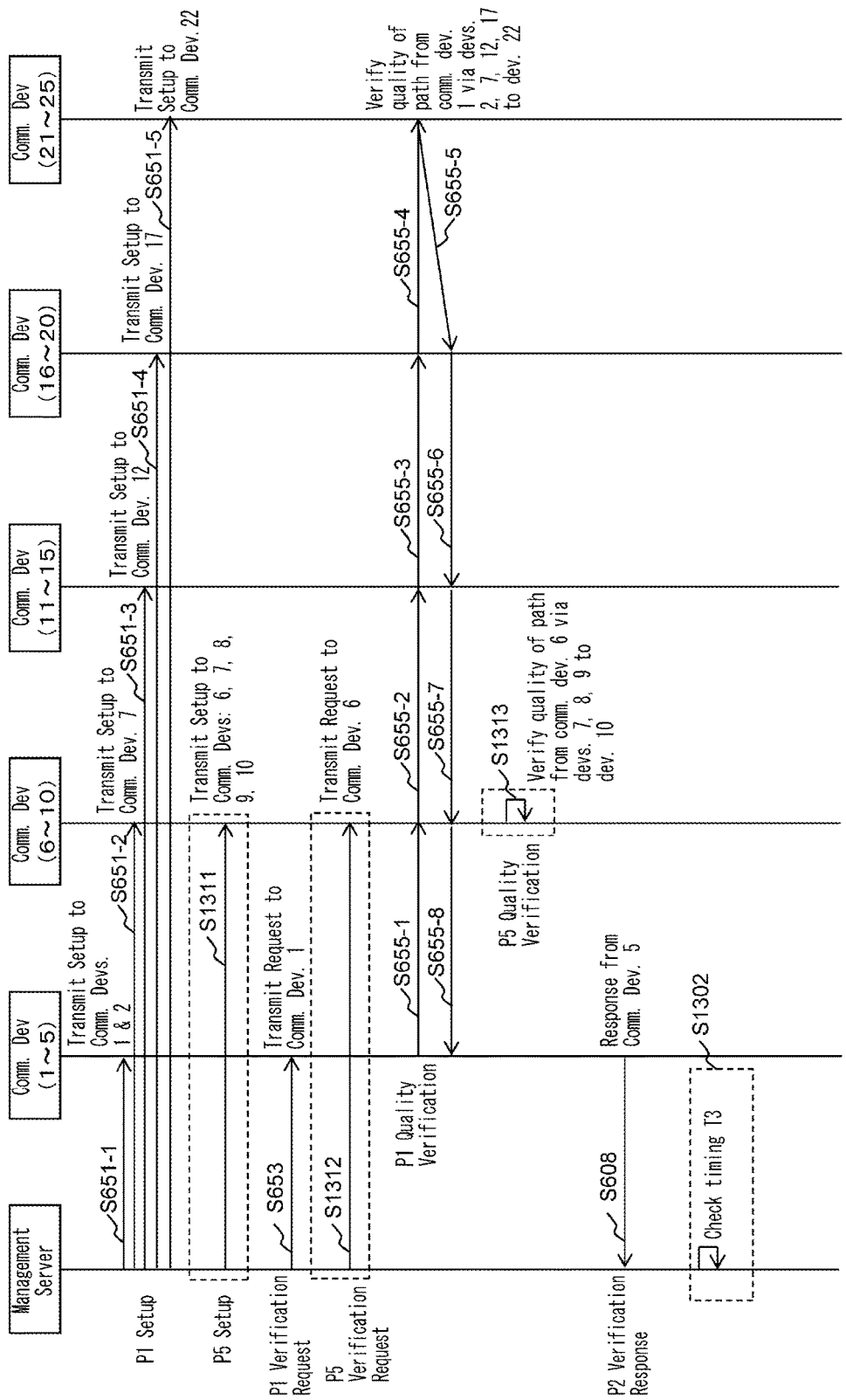

FIG. 20

PATH SETUP MANAGEMENT TABLE (timing fixed)

| # | Path Identifier (401) | Path End Point 1 (402) | Path End Point 2 (403) | List of Comm. Devs. Via Which Path Is Set (404) | No. of Comm. Devs. To Transit (405) | List of Paths Sharing a Comm. Dev. (1601) | Setup Timing (407) |
|---|---|---|---|---|---|---|---|
| 1 | P2 | B1 | B2 | 5, 4, 9, 14, 19, 18, 17, 16 | 8 | P1, P3, P4 | T1 |
| 2 | P1 | A1 | A2 | 1, 2, 7, 12, 17, 22 | 6 | P2, P3 | T2 |
| 3 | P4 | D1 | D2 | 3, 8, 13, 14, 19, 20 | 6 | P2, P3 | T2 |
| 4 | P3 | C1 | C2 | 2, 7, 8, 13, 18, 23 | 6 | P1, P2, P4 | T3 |

Rows: 1611, 1612, 1613, 1614

FIG.24A

TABLE OF SORTING PATHS BY CATEGORY (before sorting)

| # | Path Identifier | Set Bandwidth (Gbits/s) | Category |
|---|---|---|---|
| 1 | P1 | 10 | A |
| 2 | P2 | 1 | B |
| 3 | P3 | 10 | A |
| 4 | P4 | 10 | A |
| 5 | P5 | 1 | B |
| 6 | P6 | 10 | A |
| 7 | P7 | 1 | B |

FIG.24B

TABLE OF SORTING PATHS BY CATEGORY (after sorting)

| # | Path Identifier | Set Bandwidth (Gbits/s) | Category |
|---|---|---|---|
| 1 | P1 | 10 | A |
| 2 | P3 | 10 | A |
| 3 | P4 | 10 | A |
| 4 | P6 | 10 | A |
| 5 | P2 | 1 | B |
| 6 | P5 | 1 | B |
| 7 | P7 | 1 | B |

NETWORK SYSTEM, NETWORK MANAGEMENT METHOD, AND NETWORK MANAGEMENT DEVICE

INCORPORATION BY REFERENCE

This application claims priority based on Japanese patent application, No. 2016-065142 filed on Mar. 29, 2016, the entire contents of which are incorporated herein by reference.

BACKGROUND

The present invention pertains to a network system, a network management method, and a network management device and particularly relates to a network system, a network management method, and a network management device that are suitable for use to set up paths in a large-scale network subject to high quality requirements.

Along with recent expansion of communication networks, there is an increasing expectation for packet transport technologies. In packet transport technologies, paths (through which packets pass) which are established between communication devices serving as nodes are explicitly determined and their communication conditions are periodically checked, thereby managing path management status. One of the packet transport technologies is a Multi-Protocol Label Switching-Transport Profile (MPLS-TP) as a technology that is now in process of international standardization. Communication devices that support MPLS use a label that is a fixed-length identifier as path selection information to select a path. Moreover, MPLS-TP is provided with various functions for maintenance and operation.

Meanwhile, it is required to set up paths rapidly using a packet transport technology, as networks become larger in scale. A technology for setting up paths in such a large-scale network is found in Japanese Patent Application Laid-Open No. 2015-156546. In a hierarchical path control system described in Japanese Patent Application Laid-Open No. 2015-156546, the following challenge is addressed: when resetting up paths in a large-scale network, shortening a total time required for path control (resetting up) which is composed of an algorithm calculation time and a path setup time, while ensuring a predetermined accuracy. According to this hierarchical path control system, a central control device determines a collective disconnection domain according to collective topology information that is transmitted from respective subordinate control devices and then generates combined topology information in which the collective topology information is combined with topology information after the collective disconnection is performed. Then, after making path calculations and calculating order in which to set up paths, the central control device transmits results of path calculations to the respective subordinate control devices according to the order in which to set up paths.

Moreover, another technology about path setup in a network is a technology described in Japanese Patent Application Laid-Open No. 2010-11039. In a network system described in Japanese Patent Application Laid-Open No. 2010-11039, the following challenge is addressed: in a communication network in which paths are created by label switching, when setting up a path, path setup is carried out, taking account of a path setup time taken at node devices on the path. A node device in this network system measures a path setup time required to set up a path and notifies another node device of the path setup time. Each node device, upon being notified of a path setup time measured at another node device, stores the notified path setup time and determines a path based on such path setup time.

SUMMARY

For a high quality line such as an optical fiber network serving as a backbone line, to verify its quality, a verification test is performed for quality management after path setup. For example, in a quality verification test, packets are allowed to pass through a link and a packet loss and a line speed are measured.

For path setup assumed to be accompanied by such a quality verification test, there is a constraint that paths sharing the same link or the same communication device should not be set up concurrently for the purpose of verifying the quality of a set-up path. In general, the amount of calculation for path setup increases exponentially, as the number of nodes (communication devices that relay packets) increases. Hence, there is a need for a method of carrying out path setup rapidly, especially in a large-scale network.

In the above-mentioned related art, no consideration is taken about how path setup should be carried out rapidly under the constraint that paths sharing the same link or the same communication device should not be set up concurrently for the purpose of verifying the quality of a set-up path.

An object of the present invention which has been developed to address the above-noted problem is to provide a network system that enables it to execute setup of a plurality of paths rapidly, taking account of a relation between paths that makes it impossible to set up paths concurrently.

To address the above-noted problem, a network system pertaining to the present invention is configured for a network with communication devices assumed as nodes and connection paths between the communication devices assumed as links, including a network management device that are connected to the communication devices and transmits a path setup message for a path across devices to be interconnected to the communication devices. The network management device retains path information of paths as a list of node identifying information to identify nodes, the path information including information on paths sharing a link with regard to a relation in which one path shares a link with another path, and retains path setup timing with respect to each path. According to the information on paths sharing a link, the network management device determines a path setup timing for a path to be the same for a group of one or more paths that do not share a same link with the path and determines a different path setup timing for a group of one or more paths that share a same link with the path than the timing for the group including the path, and executes path setup via communication devices existing on paths constituting each group of paths as per path setup timing determined for each group.

By the above configuration, it is possible to provide a network system that enables it to execute setup of a plurality of paths rapidly, taking account of a relation between paths that makes it impossible to set up paths concurrently.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF SEVERAL VIEWS OF DRAWING

FIG. 3 is a diagram depicting an example of a path setup message packet;

FIG. 4 is a diagram depicting an example of a data forwarding table;

FIG. 5 is a diagram depicting an example of a device and connection port mapping table;

FIG. 7A is a diagram depicting a configuration of paths that are set up in the first embodiment;

FIG. 7C is a diagram depicting grouping paths that are set up at respective timings (part 2);

FIG. 8A is a diagram illustrating an example of a path setup management table in the first embodiment;

FIG. 8B is a diagram illustrating an example of the path setup management table in which paths are reordered (sorted) in descending order of path length;

FIG. 8C is a diagram illustrating an example of the path setup management table in which paths are reordered (sorted) in ascending order of inter-path distance from those in descending order of path length;

FIG. 8D is a diagram illustrating an example of the path setup management table with setup timing fixed in the first embodiment;

FIG. 9 is an example of an inter-path distance management table;

FIG. 13A is a sequence diagram illustrating a path setup process as per first timing (T1) in the first embodiment;

FIG. 13B is a sequence diagram illustrating a path setup process as per second timing (T2) in the first embodiment;

FIG. 14 is a diagram depicting a configuration of paths that are set up in a second embodiment;

FIG. 16 is a diagram illustrating an example of a path setup management table in the second embodiment;

FIG. 19B is a sequence diagram illustrating a path setup process as per second timing (T2) in the second embodiment;

FIG. 20 is a diagram illustrating an example of a path setup management table with setup timing fixed in a third embodiment;

FIG. 24A is a diagram illustrating a table of sorting paths by category before sorting; and FIG. 24B is a diagram illustrating the table of sorting paths by category after sorting.

DETAILED DESCRIPTION OF THE EMBODIMENTS

In the following, embodiments of the present invention will be described with the aid of FIGS. 1 to 24B.

When changing an operational setup of a network to configure a new network, in response to a situation where failure has occurred in a part of a network, or in preparation for a period scheduled for maintenance or other purposes, the embodiments of the present invention perform setting up paths for data transmission based on grouping paths into units allowing path setup to be carried out concurrently, thereby enabling it to reduce the processing load for path setup and perform path setup rapidly.

First Embodiment

A quality verification test is assumed to be performed in this embodiment and, for the quality verification test, it shall be impossible to set up paths sharing a same link concurrently and to verify the quality of such paths concurrently. Under this constraint, a method for grouping paths into units allowing path setup to be carried out concurrently in setting up paths for data transmission and performing path setup concurrently within a group is described.

A first embodiment of the present invention is described below with the aid of FIGS. 1 to 13B.

With FIGS. 1 to 6, first, descriptions are provided about a configuration of a network system and operation of its components, pertaining to the first embodiment.

Figure 1:
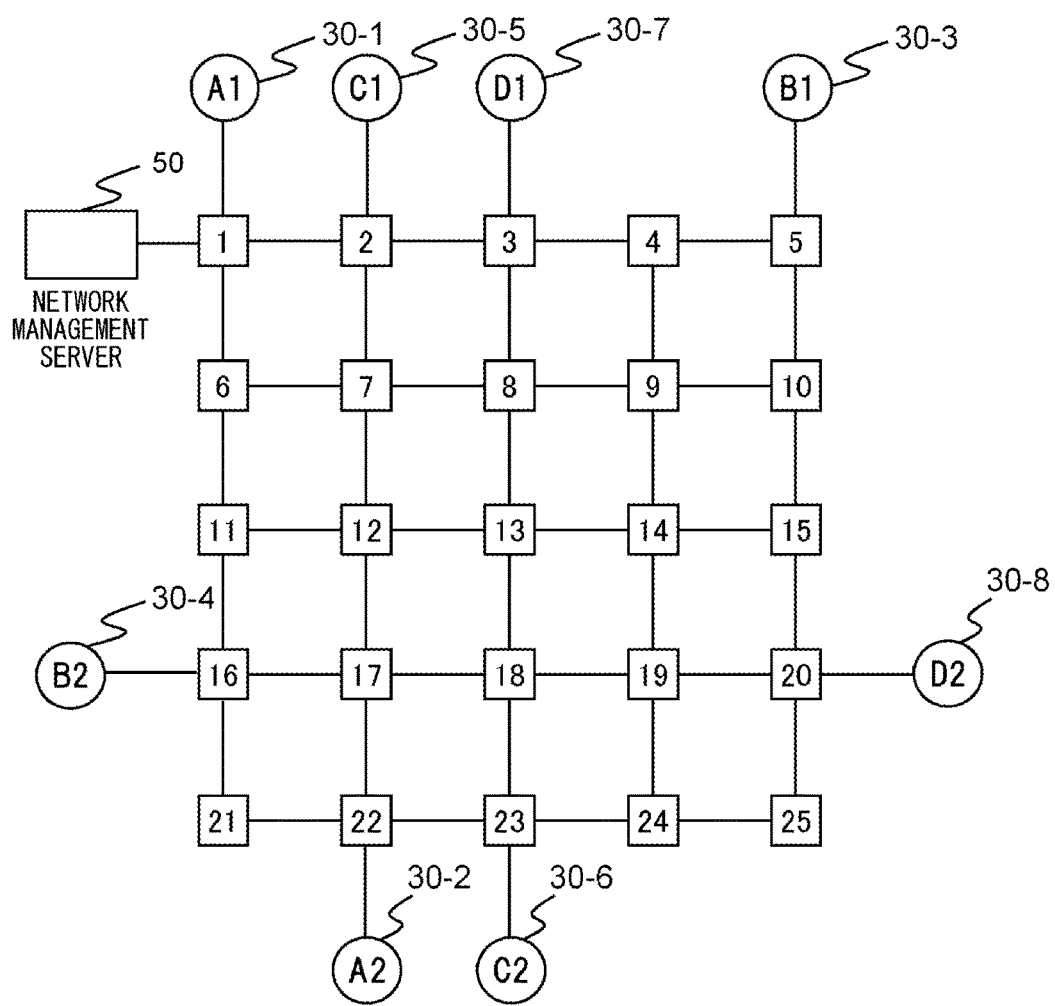
FIG. 1 is a diagram depicting a model of a network system.

FIG. 1 is a diagram depicting a model of a network system.

Figure 2:
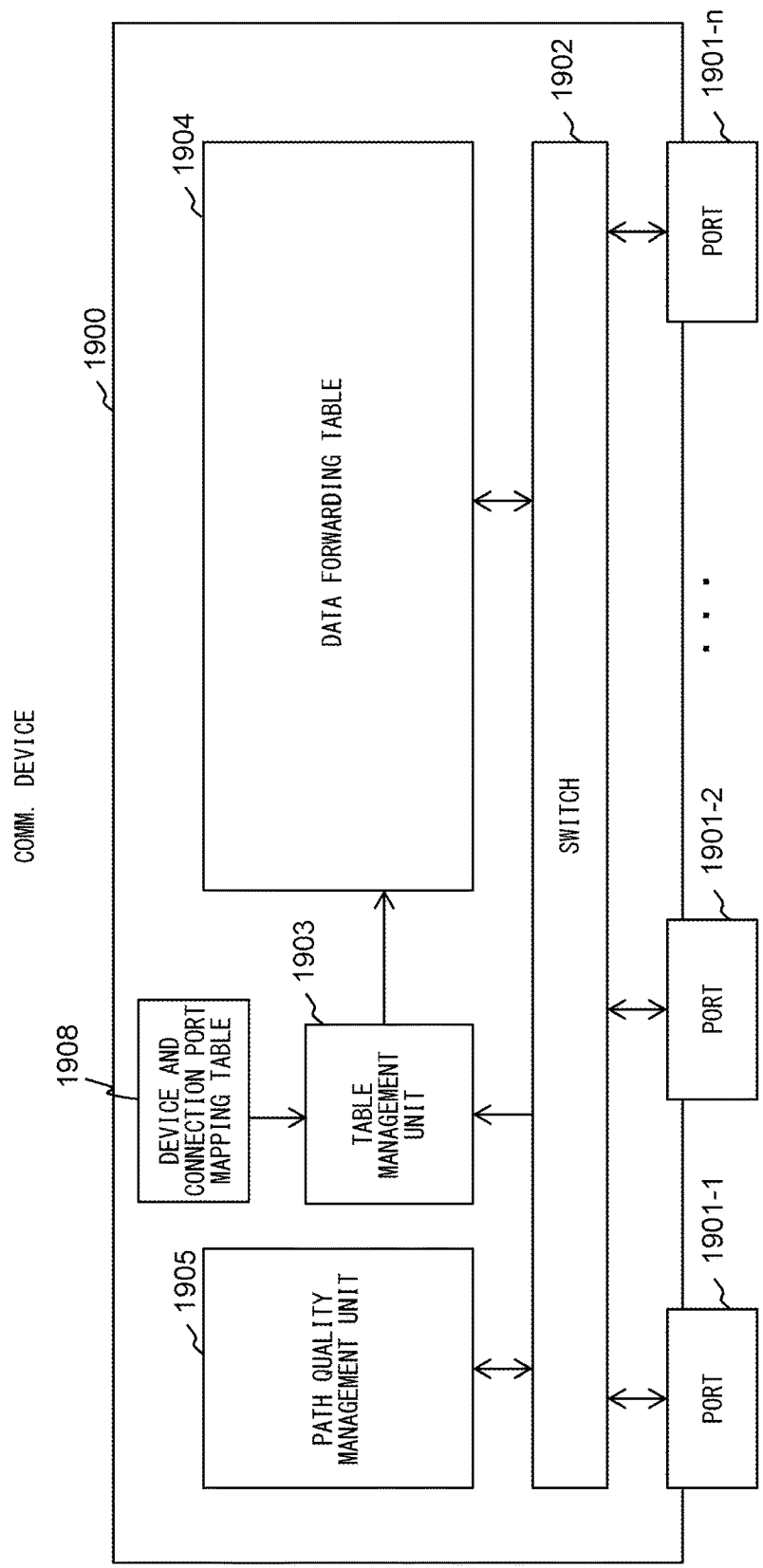
FIG. 2 is a block diagram depicting a configuration of a communication device in a first embodiment.

FIG. 2 is a block diagram depicting a configuration of a communication device in the first embodiment.

FIG. 3 is a diagram depicting an example of a path setup message packet.

FIG. 4 is a diagram depicting an example of a data forwarding table.

FIG. 5 is a diagram depicting an example of a device and connection port mapping table.

Figure 6:
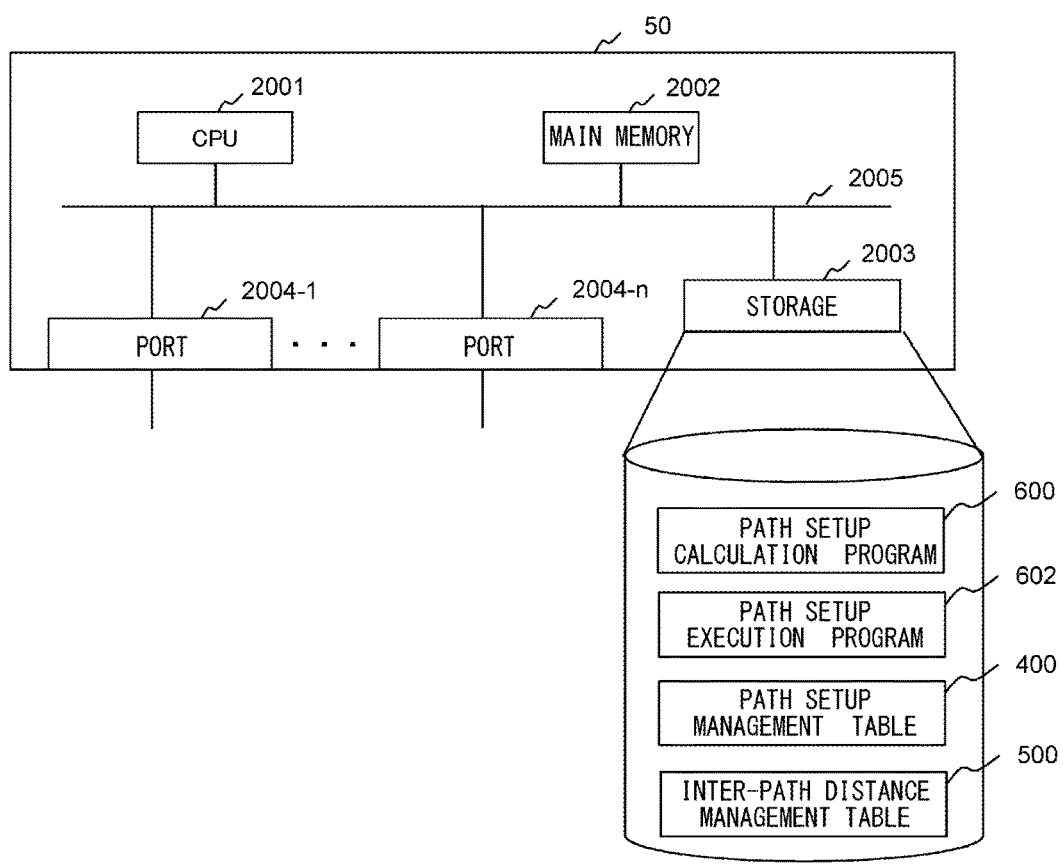
FIG. 6 is a block diagram depicting a configuration of a network management server.

FIG. 6 is a block diagram depicting a configuration of a network management server.

A network system of the present embodiment includes, a network management server 50, communication devices 1 to 25, and terminals 30 (30-1 to 30-8), as depicted in FIG. 1. A terminal is an information processing device located at an end point of a path and the terminal transmits a packet over a network and receives a packet that is transmitted from another information processing device or a communication device. And now, an information processing device located at an end point of a path is not only a terminal and may also be a server, another communication device, or a network; however, descriptions are provided assuming that an end-point device is a terminal by way of example in the present embodiment.

The network management server 50 is a server that sets up a path and broadcasts the path setup to the communication devices. And now, although, in FIG. 1, the network management server 50 is only connected to a communication device 1 for convenience sake, there may be a network for management that is different from an actual data path in an alternative form in which the network server 50 is directly connected to the respective communication devices.

A communication device 1900 is a transmission device or a router that is capable of setting up a path between communication devices according to, e.g., an MPLS protocol. A communication device includes network ports 1901-1 to 1901-*n*, a switch 1902, a table management unit 1903, a data forwarding table 1904, a device and connection port mapping table 1908, and a path quality management unit 1905, as depicted in FIG. 2.

The data forwarding table 1904 is a table that points a next data forwarding destination for a labeled packet when received from the network management server 50. Data in this data forwarding table is set according to a path setup message packet 1800 that is transmitted from the network management server 50 (detail will be described later).

A communication device 1900 receives path setup data through a network port 1901 and transmits and receives a quality status verification request packet and a packet for quality verification regarding a set-up transmission path.

When a packet to be forwarded has been received, the switch 1902 switches data to a network port 1901 as an output destination which is determined according to the data forwarding table 1904. If received data is a path setup message packet, the switch 1902 switches the received packet to be transferred to the table management unit 1903. If a quality verification request packet for a transmission path has been received, the switch 1902 switches the packet to be transferred to the path quality management unit 1905.

For a communication device located at a starting end point of a path, its path quality management unit 1905, upon receiving a quality verification request packet regarding a transmission path, transmits a packet for quality verification to verify the path quality toward a communication device located at the other end point of the path. For a communication device located at a data relay point and receiving a quality verification packet regarding a transmission path, switching data to a network port 1901 as an output destination which is determined according to the data forwarding table 1904 takes place. Meanwhile, for a communication device located at a terminating end point of a path and receiving data for quality status verification regarding a transmission path, its switch 1902 transfers data to the path quality management unit 1905. The path quality management unit 1905 transmits the received data back to the source via the switch 1902.

The table management unit 1903 rewrites the contents of the data forwarding table according to a path setup message packet received. Operation of a communication device at this time is described below.

A path setup message packet 1800, as illustrated in FIG. 3, is data that represents mapping between an input label 1800*a* and a forwarding destination communication device identifier 1800*b*, which means that, upon having received packet data with a label corresponding to a value specified as the input label 1800*a*, the packet data is to be forwarded to a communication device having an identifier specified as the forwarding destination communication device identifier 1800*b*.

The table management unit 1903 refers to a communication device identifier 1908*a* column of the device and connection port mapping table 1908 illustrated in FIG. 5 and looks for a an output destination port in a port 1908*b* column for forwarding the received packet data to a communication device having the identifier specified as the forwarding destination communication device identifier 1800*b*. The device and connection port mapping table 1908 points that a network port 1901 connected to a node having the specified communication device identifier in the communication device identifier 1908*a* column is the one mapped to that device identifier in the port 1908*b* column. Then, the table management unit 1903 sets the value as the input label 1800*a* of the path setup message packet 1800 and the thus obtained value in the port 1908*b* column as a pair, respectively, into the columns of input label 1904*a* and output port 1904*b* of the data forwarding table 1904 illustrated in FIG. 4.

As a physical configuration of a communication device depicted in FIG. 2, the path quality management unit 1905 and the table management unit 1903 implement defined processes in cooperation with other hardware in such a manner that a program stored in a storage device, not depicted, is executed by a processor, not depicted. Moreover, in the embodiment, functions equivalent to those configured by software can also be implemented by hardware such as a Field Programmable Gate Array (EPGA) and an Application Specific Integrated Circuit (ASIC).

The network management server 50, as depicted in FIG. 6, includes a CPU 2001 which is a processor (processing device), a main memory 2002 which is a storage device, a storage 2003, and network ports 2004 (2004-1 to 2004-*n*) for transmitting and receiving data over a network and these components are interconnected through a bus 2005. The server may further include input/output devices, e.g., a keyboard and an image display device. The CPU 2001 controls all parts of the network management server and executes various functions, with which the network management server 50 is equipped, of various functional units by loading various programs stored in the storage 2003 to the memory 2002 and executing the programs. The main memory 2002 stores a program which is executed by the CPU 2001 and working data necessary for executing the program.

The storage 2003 is a large-capacity storage device such as a Solid State Drive (SSD) and a Hard Disk Drive (HDD). In the present embodiment, particularly, a path setup calculation program 600, a path setup execution program 602, a path setup management table 400, an inter-path distance management table 500 are stored. The path setup calculation program 600 is a program that determines a path setup timing to execute a concurrent setup, based on given paths, and writes data into the path setup management table 400. The path setup execution program 602 is a program that sets up a path between communication devices in the network, based on the path setup management table 400. And now, the path setup management table 400 and the inter-path distance management table 500 will be detailed later.

A configuration of the network management server 50 may be configured with a single-unit computer, as in FIG. 6, or any subset of an input device, output device, processing device, and storage device may be configured with another computer connected via a network.

Figure 7B:
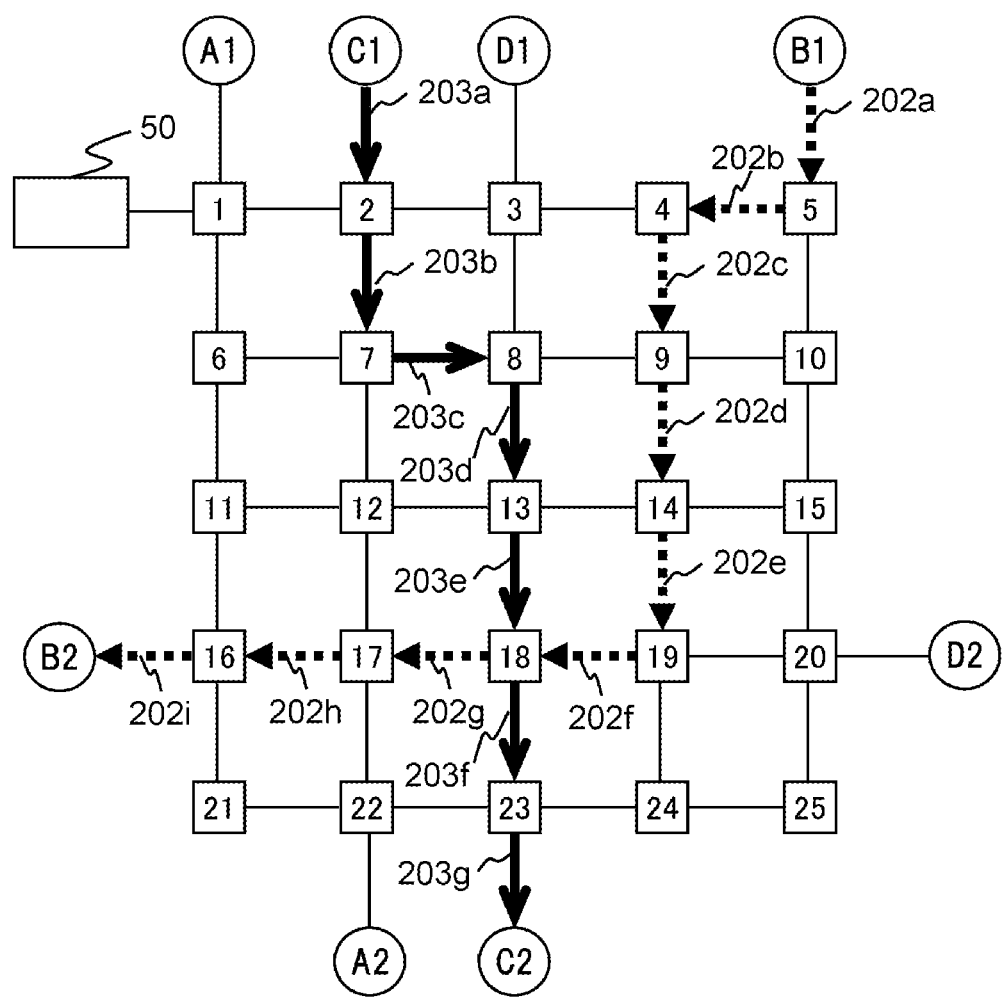
FIG. 7B is a diagram depicting grouping paths that are set up at respective timings (part 1)

Then, a path setup configuration model in the first embodiment is described with the aid of FIGS. 7A to 7C.

FIG. 7A is a diagram depicting a configuration of paths that are set up in the first embodiment.

FIGS. 7B and 7C are diagrams depicting grouping paths that are set up at respective timings.

As depicted in FIG. 7A, in the present embodiment, a first path (path P1) 201 (201*a* to 201*g*) for transmitting data is set up by a route originating from a terminal A1 (30-1), passing via communication devices 1, 2, 7, 12, 17, and 22, and terminating at a terminal A2 (30-1). A second path (path P2) 202 (202*a* to 202*i*) is set up by a route originating from a terminal B1 (30-3), passing via communication devices 5, 4, 9, 14, 19, 18, 17, and 16, and terminating at a terminal B2 (30-4). A third path (path P3) 203 (203*a* to 203*g*) is set up by a route originating from a terminal C1 (30-5), passing via communication devices 2, 7, 8, 13, 18, and 23, and terminating at a terminal C2 (30-6). A fourth path (path P4) 204 (204*a* to 204*g*) is set up by a route originating from a terminal D1 (30-7), passing via communication devices 3, 8, 13, 14, 19, and 20, and terminating at a terminal D2 (30-8).

In the present embodiment, it is assumed that the second and third paths are set up concurrently at a first timing and the first and fourth paths are set up at a second timing. An algorithm to determine a combination of paths to be set up concurrently at each timing will be detailed later.

The second and third paths that are set up at the first timing are depicted as in FIG. 7B. As depicted in FIG. 7B, the path 202 (202*a* to 202*i*) as the second path originating from a terminal B1 (30-3), passing via communication devices 5, 4, 9, 14, 19, 18, 17, and 16, and terminating at a terminal B2 (30-4) and the path 203 (203*a* to 203*g*) as the third path originating from a terminal C1 (30-5), passing via communication devices 2, 7, 8, 13, 18, and 23, and terminating at a terminal C2 (30-6) are set up at the first timing. The second and third paths pass via the same communication device 18, but the constraint in the present embodiment rules out sharing a same link, so the second and third paths can be set up concurrently and their quality can be verified.

The first and fourth paths that are set up at the second timing are depicted as in FIG. 7C. As depicted in FIG. 7C, the path 201 (201*a* to 201*g*) as the first path originating from a terminal A1 (30-1), passing via communication devices 1, 2, 7, 12, 17, and 22, and terminating at a terminal A2 (30-1) and the path 204 (204*a* to 204*g*) as the fourth path originating from a terminal D1 (30-7), passing via communication devices 3, 8, 13, 14, 19, and 20, and terminating at a terminal D2 (30-8) are set up at the second timing.

With FIGS. 8A to 8D and FIG. 9, then, descriptions are provided about data for path setup in the configuration of the paths depicted in FIGS. 7A to 7C above and an outline of an algorithm for path setup.

FIG. 8A is a diagram illustrating an example of a path setup management table in the first embodiment.

FIG. 8B is a diagram illustrating an example of the path setup management table in which paths are reordered (sorted) in descending order of path length.

FIG. 8C is a diagram illustrating an example of the path setup management table in which paths are reordered (sorted) in ascending order of inter-path distance from those in descending order of path length.

FIG. 8D is a diagram illustrating an example of the path setup management table with setup timing fixed in the first embodiment.

FIG. 9 is an example of the inter-path distance management table.

The path setup management table is comprised of the following fields of: a path identifier 401 to identify a path, path end point 1 (402) and path end point 2 (403) to indicate two end points of a path, a list of comm. devices via which path is set up 404, which is a list of communication devices via which path setup is executed, the number of comm. devices to transit (the number of hops) 405 to indicate the number of communication devices to transit, a list of paths sharing a link 406 to indicate presence of paths sharing a link, and setup timing 407 to indicate a path setup timing. In the present embodiment, descriptions are provided, taking an instance where path length is evaluated by the number of comm. devices to transit as an example. And now, as path length, an actual physical length of a path may be used. In the present embodiment, if the number of comm. devices to transit is equal for paths, the paths are evaluated to have the same path length for convenience sake. Additionally, a path for which the number of comm. devices to transit is greatest is evaluated as the longest path. Moreover, a path for which the number of comm. devices to transit is smallest is evaluated as the shortest path.

As depicted in FIG. 8A, four paths (entries 411 to 414) from the first to fourth paths are entered in this table. An entry 411 indicates that a path identifier is P1 and end points of the path depicted in FIG. 1 are A1 and A2. It also indicates that the path passes via six communication devices, i.e., communication devices 1, 2, 7, 12, 17, and 22 depicted in FIG. 1. It also indicates that the path P1 uses a common link which is shared with a path P3. Moreover, it indicates that P1 setup timing is T1. Here, T1 means that this path setup is carried out in an initial phase of, e.g., a path setup process. And now, timing may be specified by day/time or a time instant. For paths P2, P3, and P4, likewise, a path identifier 401, path end point 1 (402), path end point 2 (403), a list of comm. devices via which a path is set 404, the number of comm. devices to transit 405, a list of paths sharing a link 406, and setup timing 407 are managed. In particular, in FIG. 8A, it is indicated that the paths P1, P2, P3, and P4 are asset at timings T1, T2, T3, and T4, respectively. Note that a time sequential relation among the timings is T1<T2<T3<T4. In this case, when setup is performed with the setup timings specified in FIG. 8A as is, four paths are to be set up sequentially; therefore, an amount of time corresponding to the sum of all values of the time it takes to set up each path is the time required to set up all paths. In the present embodiment, it is enabled to shorten the time it takes to set up all paths.

With FIG. 9, then, descriptions are provided about inter-path distance and the inter-path distance management table.

In the present embodiment, a concept of "inter-path distance" is introduced to measure a relative "closeness" between paths. In the present embodiment, an inter-path distance from the first path to the second path is obtained as below: the number of links between each of the nodes (communication devices) on the first path and a nearest node on the second path is taken as a distance from the node to the second path and the sum of distances from all the nodes on the first path to the second node is calculated.

For example, the path P2 is comprised of the following nodes; communication device 5, 4, 9, 14, 19, 18, 17, and 16. From a communication device 5 on the path P2, the path P1 can be reached via communication devices 4, 3, and 2 by passing through three links; therefore, a distance from the communication device 5 to the path P1 is 3. From a next communication device 4 on the path P2, the path P1 can be reached via communication devices 3 and 2 by passing through two links; therefore, a distance from the communication device 4 to the path P1 is 2. Moreover, a next communication device 9 on the path P2, the path P1 can be reached via communication devices 8 and 7 by passing through two links; therefore, a distance from the communication device 9 to the path 1 is 2. Distances from subsequent nodes on the path P2 to the path P1 are obtained in the same way; then, a result is {3, 2, 2, 2, 2, 1, 0, 1}. The sum of these values, 13 is obtained as an inter-path distance from the first path to the second path.

The inter-path distance table is a table for holding the thus obtained inter-path distances between a reference path (a first path) and a second path.

In an example illustrated in FIG. 9, an example is presented in which the path P2 is chosen as a reference path and the paths P1 and P3 are chosen as second paths.

A list of communication devices on the path P2 is present in an entry 520 and values of distance relative to the communication devices on the path P2 are present with respect to the paths P1 and P3, respectively, in entries 521 and 522. The sum of these values is obtained as 13 and 11, respectively. Accordingly, it is evident that an inter-path distance between path P2 and path P1 is 13 and an inter-path distance between path P2 and path P3 is 11. That is, according to this result, the inter-path distance between path P2 and path P3 is smaller than the inter-path distance between path P2 and path P1. Therefore, an evaluation of closeness from a reference path (path p2) as metrics of inter-path distance can determine that path P3 is "closer" than path P1.

Although a distance from a node on one path to another path in the present embodiment is defined based on what number of links to path through, an actual physical distance may be used.

Then, with the path setup management table having data for path setup as in FIG. 8A, the paths are grouped for setup using FIG. 8B and FIG. 8C. Descriptions are provided about setup in the table with setup timing fixed and an outline of an algorithm for grouping the paths.

First, as a first step, for path setup in the present invention, the network management server 50 reorders (sorts) the paths to set up in descending order of the number of comm. devices to transit 405 (from a longer path to a short path). The path setup management table illustrated in FIG. 8B represents a state after the paths are reordered in the descending order of path length. As illustrated in FIG. 8B, path P2 for which the number of comm. devices to transit is 8 is placed in a top position in the table. Meanwhile, other paths are not reordered, since the number of comm. devices to transit for these paths is an equal number of 6.

Then, as a second step, after sorting the path setup management table, as illustrated in FIG. 8B, the paths having the same path length (passing via the same number of comm. devices) are reordered in ascending order of inter-path distance from the longest path. However, a path that uses a same link that is used by the reference longest path is removed from reordering the paths in ascending order of inter-path distance, since it belongs to another group. The path setup management table illustrated in FIG. 8C represents the result of reordering the paths in ascending order of inter-path distance (entries 431 to 434) relative to the reference longest path P2 (entry 431). In this process of reordering (sorting) the paths in ascending order of inter-path distance from the path P2, the path P4 is removed from the reordering process, because it uses a same link that is used by the path P2. Here, a comparison is made between the inter-path distance between the paths P2 and P1 and that between the paths P2 and P3. Since the inter-path distance of the path 3 from the path P2 is shorter than that of the path P1, the paths in the management table are reordered in order that is suitable for managing the paths, as illustrated in FIG. 8C; i.e., order of path P2, path P3, path P1, and path P4 from top (entries 431 to 434).

Then, as a third step, path setup timing is fixed for each path. At this time, grouping a plurality of paths (each not sharing a link) is performed and an identical path setup timing is assigned to a same group. That is, the network management server 50 groups the respective paths for path setup in the path setup management table illustrated in FIG. 8C and fixes path setup timing.

In the path setup management table illustrated in FIG. 8C, the network management server 50 selects P2 which is the longest path as the reference path and sets its setup timing to T1. Then, the network management server 50 checks the path P3 which is a next candidate for path setup and verifies that P3 does not share a same link with the path P2 already selected by referring to the list of paths sharing a link 406. Since path P3 does not use a same link that is used by the path P2, the server selects P3 as a path allowed to be setup concurrently with the path P2 and sets its setup timing to T1. Then, the network management server 50 checks the path P1 which a next candidate for path setup and verifies that P1 does not use a same link that is used by the paths P2 and P3 already selected by referring to the list of paths sharing a link 406. Here, as indicated in the list of paths sharing a link 406, the path P1 uses a same link that is used by the path P3 and, therefore, it is verified that both paths cannot be set up concurrently. Consequently, the server sets path setup timing of the path P1 to T2 which is next timing. Then, the network management server 50 checks the path P4 which is a next candidate for path setup and verifies that P4 does not use a same link that is used by the path P1 already selected to be set up at timing T2 by referring to the list of paths sharing a link 406. Since the path P4 does not share a same link with the path P1, the server selects the path P4 as a path allowed to be set up concurrently with the path P1 and sets its setup timing to T2. The path setup management table illustrated in FIG. 8D represents a state after execution of the above processing. That is, path setup of the paths P2 and P3 will be executed concurrently at the first timing T1 (entries 441, 442). Path setup of the paths P1 and P4 will be executed concurrently at the next timing T2 (entries 443, 444). And now, by way of example, the next timing corresponds to a point of time that follows upon the completion of setting up all paths executed at the preceding timing.

The intention of reordering paths from the longest path, grouping paths in ascending order of inter-path distance from the longest path, and fixing setup timing, as described above, is as follows: selecting the longest path first increases the possibility that a group of paths can be determined efficiently from a network topology perspective; and a path having shorter inter-path distance relative to the selected path has a high possibility that it can be put in a same group including the selected path.

Figure 10:
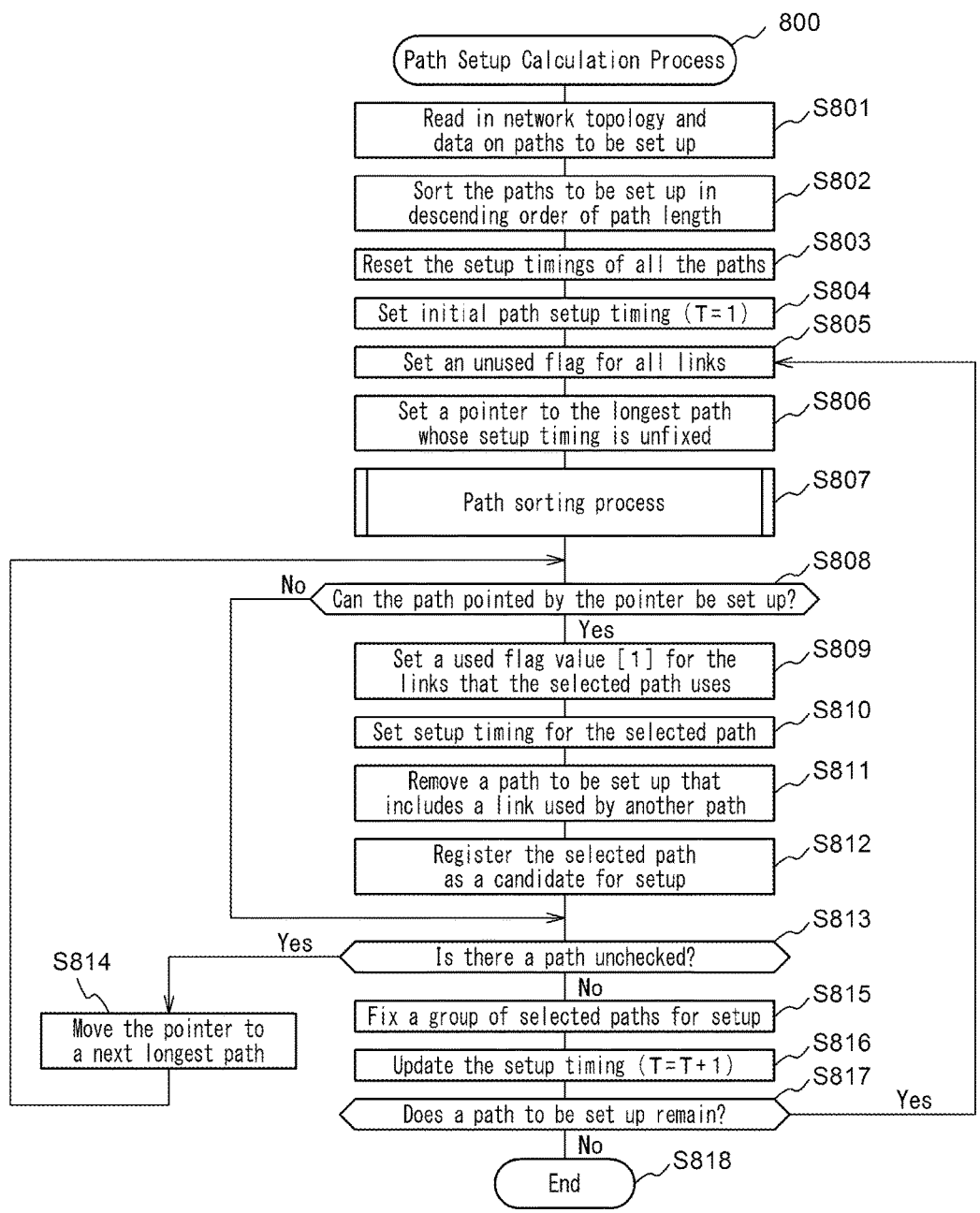
FIG. 10 is a flowchart illustrating a process according to a path setup calculation program in the first embodiment.
Figure 11:
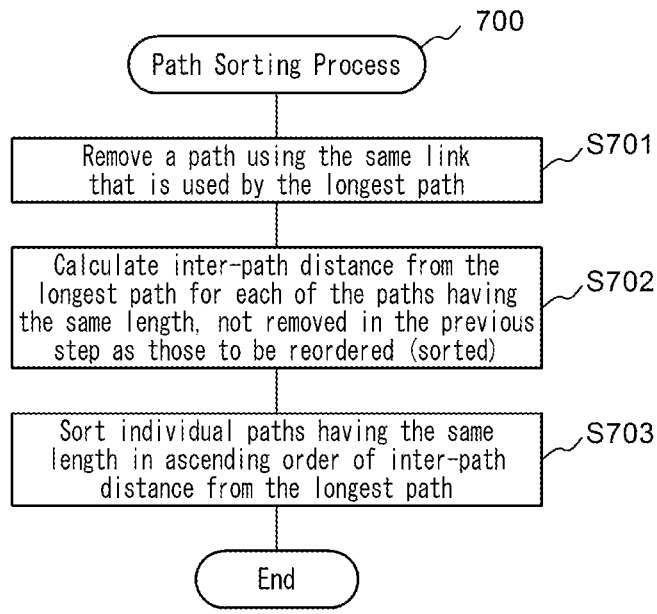
FIG. 11 is a flowchart illustrating a process according to a path sorting program in the first embodiment.
Figure 12:
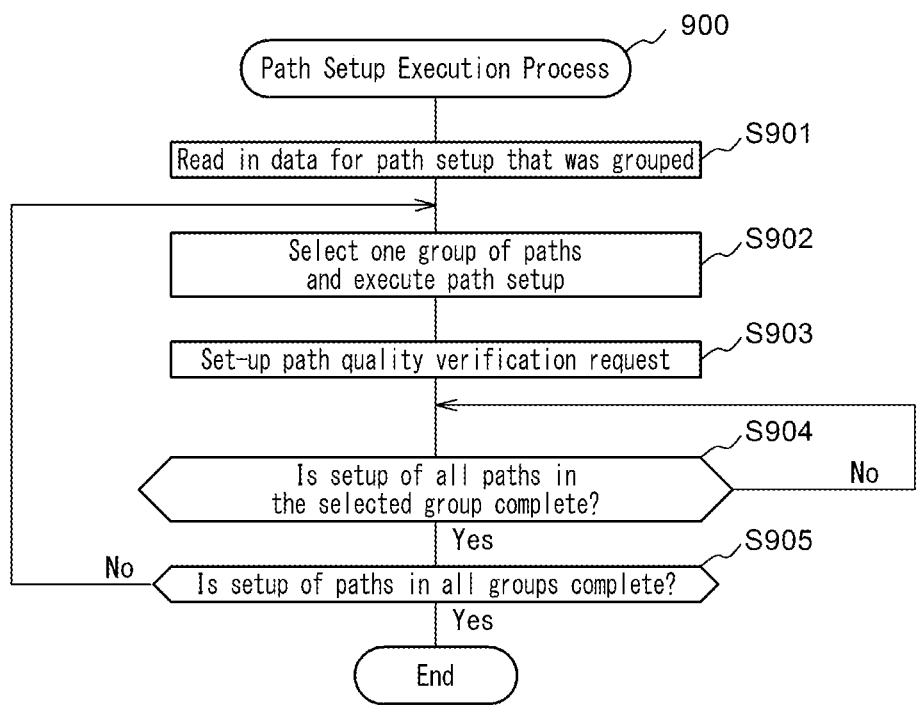
FIG. 12 is a flowchart illustrating a process according to a path setup execution program in the first embodiment.

With FIGS. 10 to 12, then, a process regarding path setup in the first embodiment is described in detail.

FIG. 10 is a flowchart illustrating a process according to a path setup calculation program in the first embodiment.

FIG. 11 is a flowchart illustrating a process according to a path sorting program in the first embodiment.

FIG. 12 is a flowchart illustrating a process according to a path setup execution program in the first embodiment.

In the process according to the path setup calculation program (800 in FIG. 10), the network management server 50 loads the path setup calculation program 600 to the CPU 2001 and starts the program.

First, the network management server 50 reads in network topology data depicted in FIG. 1 and data on the paths to be set up, depicted in FIG. 8A (S801).

The network management server 50 performs reordering (sorting) the paths to be set up in descending order of path length (S802), as described with FIG. 8B.

Then, the network management server 50 once resets the setup timings of all the paths to be set up in the data read in the memory (S803).

Next, the network management server 50 sets 1 for initial path setup timing as a basis to determine setup timing of each path (S804).

Then, the network management server 50 sets a value of 0 indicating unused status for link use flags of all links in the data read in the memory (S805).

Next, the network management server 50 sets a pointer for execution of processing to determine path setup timing to the longest path whose setup timing is unfixed (not set) (S806).

Then, the server executes a path sorting process by inter-path distance (S807). That is, the network management server 50 executes the path sorting program and performs reordering (sorting) the paths in ascending order of inter-path distance in terms of distance from the reference longest path. In particular, the server performs reordering (sorting) the paths as in the path setup management table in FIG. 8C, based on calculations of inter-path distance from the reference path, as illustrated in the inter-path distance management table in FIG. 9. The path soring process will be detailed later.

Next, the network management server 50 decides whether or not the path pointed by the pointer can be set up (S808).

If the path pointed by the pointer can be set up, as decided at S808 (S808: Yes), the network management server 50 sets a value of 1 indicating used status for the link use flags of all links that the selected path uses (S809).

Next, the network management server 50 sets path setup timing (T) for the path pointed by the pointer (S810).

The network management server 50 removes all candidates for path setup that use a same link that is used by the path for which path setup timing was determined at S810 from a list of paths as candidates allowed to be set up concurrently (S811).

The network management server 50 fixes the path for which path setup timing was determined as a candidate for path setup (S812).

The network management server 50 decides whether or not there is a path unchecked as to whether or not it can be set up concurrently at the same timing (S813).

If the decision at S808 decided that the path pointed by the pointer cannot be set up in a manner of concurrent path setup, since it shares a link with another path already selected (S808: No), then the network management server 50 executes the processing step S813 next.

If there is a path unchecked as to whether or not it can be set up concurrently at the same timing, as decided at S813 (S813: Yes), the network management server 50 moves the pointer to a next longest path (S814) and then executes S808.

If there is not a path unchecked as to whether or not it can be set up concurrently at the same timing, as decided at S813 (S813: No), the network management server 50 fixes selected candidates for path setup as a group allowed to be set up concurrently (S815).

Then, the network management server 50 performs updating the setup timing value T (new T=old T+1) (S816).

The network management server 50 decides whether or not a path for which path setup timing is not yet determined remains (S817).

If a path for which path setup timing is not yet determined remains, as decided at S817 (S817: Yes), the network management server 50 executes S805.

If a path for which path setup timing is not yet determined does not remain, as decided at S817 (S817: No), the network management server 50 terminates the path setup process.

Then, the path sorting process is described with FIG. 11. This is the process of S807 in FIG. 10.

In the path sorting process 700, the network management server 50 loads the path sorting program by inter-path distance to the CPU and starts the program.

Then, the CPU 2001 of the network management server 50 removes all paths to be set up that use a same link that is used by the longest path from the paths to be reordered (sorted) (S701). And now, the longest path is a path that passes via a maximum number of communication devices in the present embodiment.

Next, the CPU 2001 of the network management server 50 calculates distance from the longest path for each of the paths having the same path length, which were not removed at S701 (S702), as described with FIG. 9. And now, paths having the same path length are those passing via the same number of communication devices in the present embodiment.

Next, the CPU 2001 of the network management server 50 performs reordering (sorting) of individual paths (in a path group) having the same path length in ascending order of inter-path distance from the longest path (S703), as described with FIG. 8C.

Upon completion of the processing step S703, then, the CPU 2001 of the network management server 50 terminates the program execution.

Then, a path setup execution process is described with FIG. 12.

In the path setup execution process (900 in FIG. 12), the network management server 50 first loads a path setup execution management program to the CPU 2001 and starts the program.

Then, the network management server 50 reads in data for path setup that was grouped by path setup timing (S901), as illustrated in the path setup management table in FIG. 8D.

Next, the network management server 50 selects one group of grouped paths and executes path setup. In particular, the server selects a plurality of paths with T1 described in the setup timing 407 field and executes path setup (S902).

After the execution of setup of a path, then, the network management server 50 transmits a request to verify the quality of the set-up path to a communication device located at a starting end point of the path (S903).

Next, the network management server 50 decides whether or not setup of all paths belonging to the group subjected to path setup execution (S904). In particular, the server decides whether or not it has received a path setup completion message from all communication devices to which it transmitted a request to verify the path quality.

If setup of all paths subjected to setup execution is not complete, as decided at S904 (S904: No), the network management server 50 continues S904.

If setup of all paths subjected to setup execution is complete, as decided at S904 (S904: Yes), the network management server 50 decides whether or not setup of paths in all groups is complete (S905).

If setup of paths in all groups is not complete, as decided at S905 (S905: No), the network management server 50 executes S902.

If setup of paths in all groups is complete, as decided at S905 (S905: Yes), the network management server 50 terminates the grouped path setup process.

Then, the path setup process in the first embodiment with respect to the network model depicted FIG. 1 is explained with FIGS. 13A and 13B.

FIG. 13A is a sequence diagram illustrating a path setup process as per the first timing (T1) in the first embodiment.

FIG. 13B is a sequence diagram illustrating a path setup process as per the second timing (T2) in the first embodiment.

At this point of time, it is assumed that the path setup calculation program has been executed and its result for path setup is stored in the path setup management table.

First, the network management server 50 reads in data contained the path setup management table (S601).

Then, the network management server 50 transmits a path (P2) Setup message to set up a path for data transmission from a terminal B1 (30-3) to a terminal B2 (30-4) to communication devices 5, 4, 9, 14, 19, 18, 17, and 16 (S602-1 to S602-4).

Next, the network management server 50 transmits a path (P3) Setup message to set up a path for data transmission from a terminal C1 (30-5) to a terminal C2 (30-6) to communication devices 2, 7, 8, 13, 18, and 23 (S603-1 to S603-5).

Then, the network management server 50 transmits a request message to execute quality verification of the set-up path P2 to a communication device 5 located at an end point among the communication devices on the path P2 (S604).

Next, the network management server 50 transmits a request message to execute quality verification of the set-up path P3 to a communication device 2 located at an end point among the communication devices on the path P3 (S605).

Then, the communication device 5 transmits data for quality verification to a communication device 16 via communication devices 4, 9, 14, 19, 18, and 17 and the communication device 16 transmits the received data back to the communication device 5 via the communication devices 17, 18, 19, 14, 9, and 4 (S606-1 to S606-6).

Then, the communication device 2 transmits data for quality verification to a communication device 23 via communication devices 7, 8, 13, and 18 and the communication device 23 transmits the received data back to the communication device 2 via the communication devices 18, 13, 8, and 7 (S607-1 to S607-8).

Next, the communication device 5 judges the quality of the set-up path based on the data transmitted back by the communication device 16 and notifies the network management server 50 that the path has been set up properly (S608).

Then, the communication device 2 judges the quality of the set-up path based on the data transmitted back by the communication device 23 and notifies the network management server 50 that the path has been set up properly (S609).

Upon completion of path setup at the first timing, then, the network management server 50 confirms whether or not there is another path to be set up (S650 in FIG. 13B).

Next, the network management server 50 transmits a path (P1) Setup message to set up a path for data transmission from a terminal A1 (30-1) to a terminal A2 (30-2) to communication devices 1, 2, 7, 12, 17, and 22 (S651-1 to S651-5).

Next, the network management server 50 transmits a path (P4) Setup message to set up a path for data transmission from a terminal D1 (30-7) to a terminal D2 (30-8) to communication devices 3, 8, 13, 14, 19, and 20 (S652-1 to S652-4).

Then, the network management server 50 transmits a request message to execute quality verification of the set-up path P1 to a communication device 1 located at an end point among the communication devices on the path P1 (S653).

Next, the network management server 50 transmits a request message to execute quality verification of the set-up path P4 to a communication device 3 located at an end point among the communication devices on the path P4 (S654).

Then, the communication device 1 transmits data for quality verification to a communication device 22 via communication devices 2, 7, 12, and 17 and the communication device 22 transmits the received data back to the communication device 1 via the communication devices 17, 12, 7, and 2 (S655-1 to S655-8).

Next, the communication device 3 transmits data for quality verification to a communication device 20 via communication devices 8, 13, 14, and 19 and the communication device 20 transmits the received data back to the communication device 3 via the communication devices 19, 14, 13, and 8 (S656-1 to S656-6).

Then, the communication device 1 judges the quality of the set-up path based on the data transmitted back by the communication device 22 and notifies the management server 50 that the path has been set up properly (S657).

Then, the communication device 3 judges the quality of the set-up path based on the data transmitted back by the communication device 20 and notifies the management server 50 that the path has been set up properly (S658).

Upon completion of path setup at the second timing, the network management server 50 confirms whether or not there is another path to be set up (S659).

In the present invention, there is not another path to be set up and, therefore, the network management server 50 completes path setup (S660).

As described above, by grouping a plurality of paths that do not share a same link and setting up the grouped paths concurrently, it is enabled to setup paths rapidly. Moreover, after confirming setup completion for each of individual paths in a group, it begins to set up paths in a next group concurrently; thus, concurrent setup of paths can be executed reliably. Moreover, by grouping paths allowed to be set up concurrently according to the positions of paths in ascending order of inter-path distance from the reference path and according to descending order of path length, it is enabled to increase the number of paths allowed to be set up concurrently and the time it takes to set up all paths can be shortened. And now, although grouping paths according to descending order of path length is performed in the present embodiment, as another way of grouping, for example, paths may be grouped according to ascending order path length.

Second Embodiment

As is the case for the first embodiment, a quality verification test is assumed to be performed also in this embodiment and, for the quality verification test, it shall be impossible to set up paths sharing a same link concurrently and to verify the quality of such paths concurrently. In the first embodiment, timing to begin concurrent processing for a group is only constrained to occur after the execution of setup of paths in a preceding group and others are not prescribed in detail. In this embodiment, upon detecting timing when setup of one or more paths for data transmission has been completed, path setup is to be executed concurrently for all paths allowed to be set up concurrently at the point of time.

In the following, descriptions are provided, focusing on differences from the first embodiment.

Figure 15:
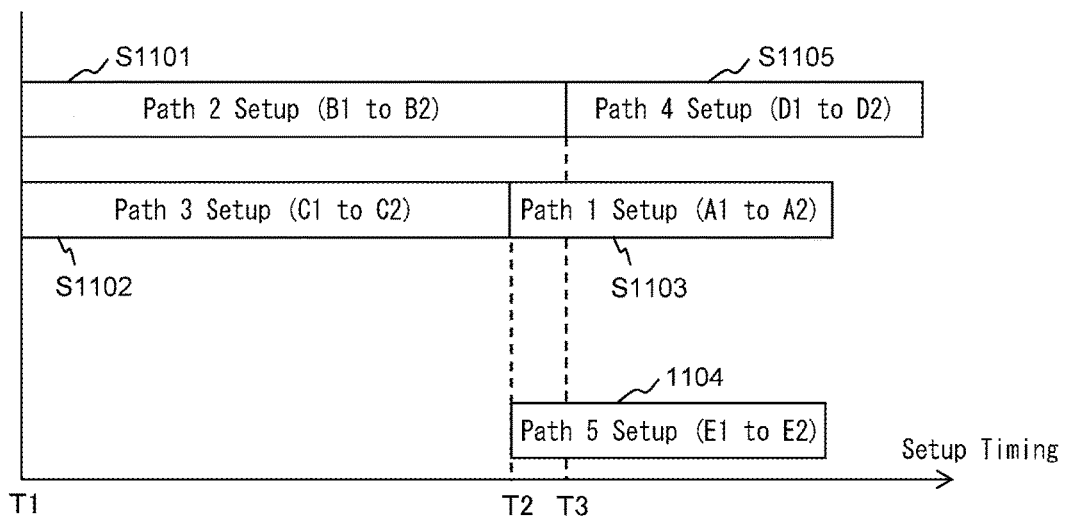
FIG. 15 is a diagram depicting path setup timings in the second embodiment.

First, a path setup configuration model of the second embodiment is described with the aid of FIGS. 14 and 15.

FIG. 14 is a diagram depicting a configuration of paths that are set up in the second embodiment.

FIG. 15 is a diagram depicting path setup timings in the second embodiment.

In the present embodiment, in addition to the paths that are set up, which were described with FIG. 7A, in the first embodiment, a fifth path (path 5) 205 (205a to 205f) is further set up by a route originating from a terminal E1 (30-9), passing via communication devices 6, 7, 8, 9, and 10, and terminating at a terminal E2 (30-10).

Timings to set up the paths in the present embodiment are depicted as in FIG. 15.

In the present embodiment, at a first timing T1 (T=1), the second and third paths described in FIG. 7A are set up concurrently (S1101, S1102). Moreover, at a second timing T2 (T=2), the first path described in FIG. 7A and the fifth path are set up concurrently (S1103, S1104). Furthermore, at a third timing T3 (T=3), the fourth path described in FIG. 7A is set up (S1105). An algorithm to determine a combination of paths to be set up concurrently at each timing will be detailed below.

With FIG. 16, then, descriptions are provided about data for path setup in the configuration of the paths depicted in FIG. 15 above and an outline of an algorithm for path setup.

FIG. 16 is a diagram illustrating an example of a path setup management table in the second embodiment.

In addition to setup timing for the paths that should be set up, specified in the path setup management table relevant to the first embodiment, the path setup management table relevant to the present embodiment indicates a relation between setup timing of paths to be set up and a path whose setup is already complete.
Organization of the fields of the path setup management table in FIG. 16 is the same as that of the fields 401 to 407 of the path setup management table in FIG. 8A. In the path setup management table in FIG. 16, there is an additional field, "upon setup completion" 410 upon which setup timing follows. In path setup in the present embodiment, as depicted in FIG. 15, the paths P2 and P3 are set up concurrently at the first timing T1 (entries 1201 and 1202 in FIG. 16). Subsequently, when the completion of path P3 setup is confirmed, it is confirmed that second timing T1 has come and, then, setup of paths P1 and P5 is executed concurrently (upon setup completion 410 for entries 1203 and 1024). Subsequently, when the completion of path P2 setup is confirmed, it is confirmed that third timing T3 has come and, then, setup of path P4 is executed (upon setup completion 410 for an entry 1205).

Figure 17:
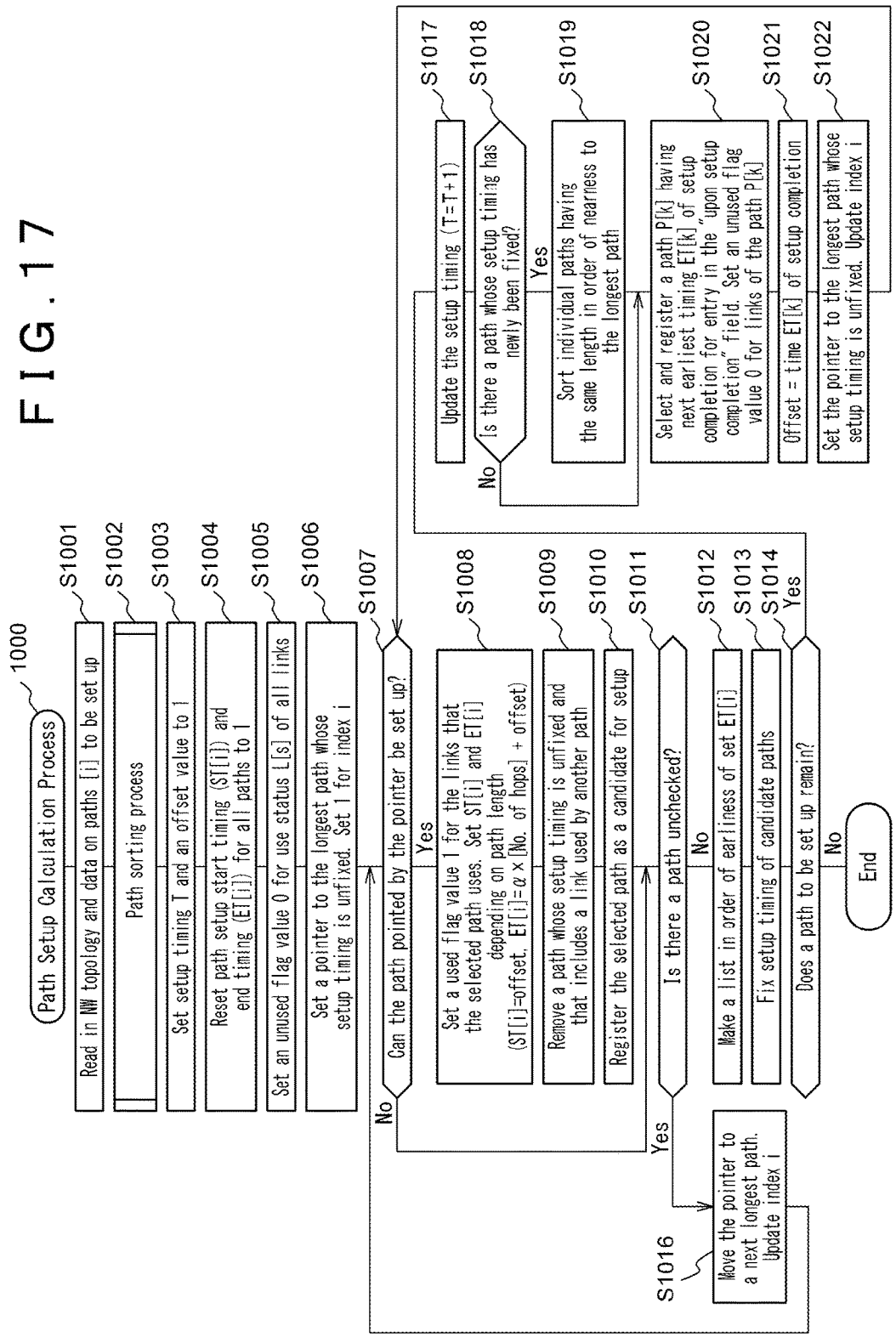
FIG. 17 is a flowchart illustrating a process according to the path setup calculation program in the second embodiment.
Figure 18:
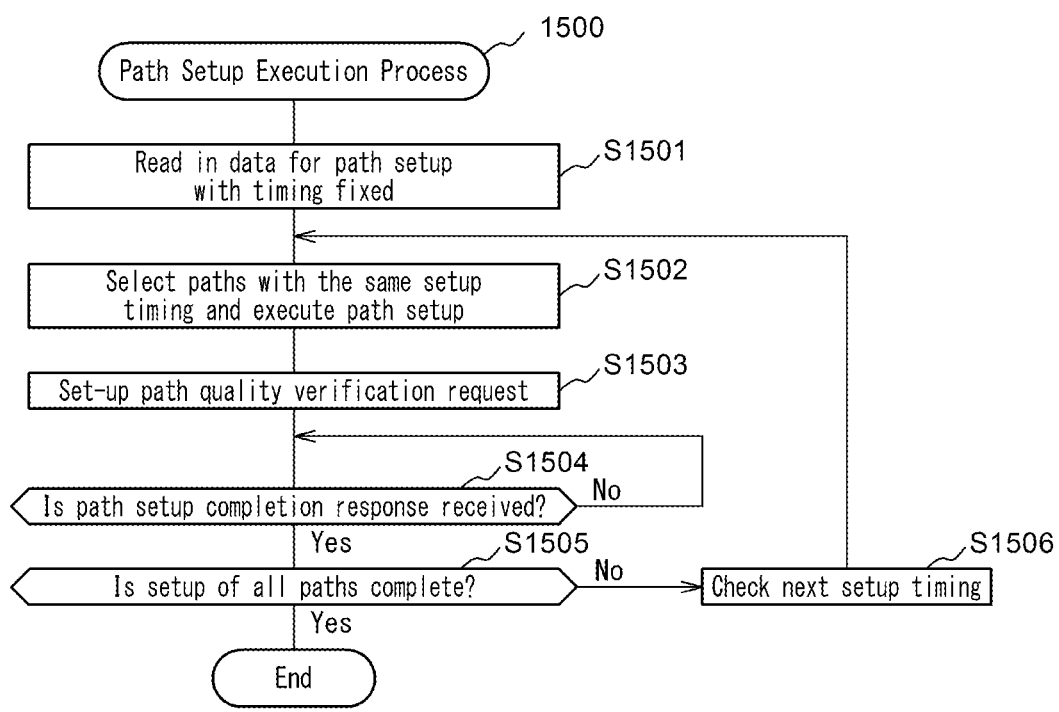
FIG. 18 is a flowchart illustrating a process according to the path setup execution program in the second embodiment.

With FIGS. 17 and 18, then, a process regarding path setup is described in detail.

FIG. 17 is a flowchart illustrating a process according to the path setup calculation program in the second embodiment.

FIG. 18 is a flowchart illustrating a process according to the path setup execution program in the second embodiment.

In the process according to the path setup calculation program (1000 in FIG. 17), the network management server 50 loads the path setup calculation program 600 to the CPU 2001 and starts the program.

The network management server 50 reads in network topology data depicted in FIG. 1 and data on the paths to be set up, depicted in FIG. 14 (S1001).

Then, the network management server 50 performs reordering (sorting) the paths in order of nearness in terms of distance from the reference longest path (S1002), as described with FIG. 11 in the first embodiment. In particular, the server reorders path data in the path setup management table illustrated in FIG. 16 except for the fields of setup timing 407 and upon setup completion 410.

Next, the network management server 50 sets 1 for initial setup timing T and an offset value (Offset) (S1003).

The network management server 50 sets setup start timing ST[i] (i=1 to N: the number of paths) and setup end timing ET[i] (i=1 to N: the number of paths) for all paths to 0 and sets index i to 1 (S1004).

The network management server 50 sets a value of 0 indicating unused status for link use flags L[s] (s=1 to M: the number of links) of all links between devices (S1005). The network management server 50 sets a pointer for execution of processing to determine path setup timing to the longest path whose setup timing is unfixed (not set) (S1006).

The network management server 50 decides whether or not the path pointed by the pointer can be set up (S1007).

If the path pointed by the pointer can be set up, as decided at S1007 (S1007: Yes), the network management server 50 sets a value of 1 indicating used status for the link use flags L[s] of all links that the selected path uses. Also, the network management server 50 assigns the current offset value to the setup start time ST[i] (i: selected path identifier) of the selected path. Also, the network management server 50 assigns a value obtained by multiplying the number of communication devices that the selected path passes through (the number of Hops) by a predetermined coefficient $\alpha$ and adding the current offset value to the product to the setup end time ET[i] (i: selected path identifier) of the selected path (ET[i]=$\alpha \times$(the number of Hops)+Offset) (S1008).

Then, the network management server 50 removes a path whose setup timing is not set and that uses a link used by the selected path (S1009).

Next, the network management server 50 registers and retains the selected path as a candidate for path setup at the current timing and retains the data (S1010).

Next, the network management server 50 decides whether there is a path whose path setup timing is unfixed and that does not share a link with the path selected as a candidate for setup (S1011).

If the path pointed by the pointer cannot be set up, as decided at S1007 (S1007: No), the network management server 50 execute S1011.

If there is a path whose path setup timing is unfixed and that does not share a link with the path selected as a candidate for setup, as decided at S1011 (S1011: Yes), the network management server 50 moves the pointer to a next longest path, updates index i (S1016), and executes the decision step S1007.

If there is not a path whose path setup timing is unfixed and that does not share a link with the path selected as a candidate for setup, as decided at S1011 (S1011: No), the network management server 50 makes a list of paths reordered in order of earliness of path setup end time ET[i] that has already been set (i: a path with set ET) (S1012).

Then, the network management server 50 fixes setup timing T of the path registered and retained as a candidate to the current value of T (S1013).

Next, the network management server 50 decides whether or not a path for which path setup timing is not yet determined remains (S1014).

If a path for which path setup timing is not yet determined does not remain, as decided at S1014 (S1014: No), the network management server 50 terminates the path setup timing management process.

If a path for which path setup timing is not yet determined remains, as decided at S1014 (S1014: Yes), the network management server 50 updates the value of T that denotes setup timing (new T=old T+1) (S1017).

Then, the network management server 50 decides whether or not there is a path whose setup timing has newly been set (S1018).

If there is a path whose setup timing has newly been set, as decided at step S1018 (S1018: Yes), the network management server 50 performs reordering (sorting) of individual paths having the same path length (those passing via the same number of comm. devices) in order of nearness from the longest path (with the largest number of comm. devices to transit) (S1019).

Then, the network management server 50 selects a path P[k] having next earliest timing of setup completion ET[k] (k; the identifier of a path for which the time of path setup completion is earlier), registers its identifier for entry in the "upon setup completion" field to know the path setup timing T that is currently set, and sets a value of 0 indicating unused status for link use flags L[s] of the links used by the path P[k] whose setup is anticipated to be complete at the time ET[k] (S1020).

If there is not a path whose setup timing has newly been set, as decided at step S1018 (S1018: No), the network management server 50 executes S1020.

Then, the network management server 50 assigns the anticipated time of path setup completion ET [k] of the path P[k] whose setup is anticipated to be complete at the time ET[k] to the offset value (Offset) (S1021).

The network management server 50 moves the pointer to a path whose setup timing is not set and that has the longest path length, updates index i (S1022), and executes the decision step S1007.

To explain specifically with the example illustrated in FIG. 16 and FIG. 15, the respective paths are P[1]=P2, P[2]=P3, P[3]=P1, P[4]=P5, and P[5]=P4.

At the point of time T=1, P[1]=P2 and P[2]=P3 are selected as a list of selected candidates (S1010).

At the point of time T=2, P[2]=P3 is selected as a path having next earliest timing of setup completion (S1020) and ET[2], the time of setup completion of P3 is assigned to Offset (S1021).

Then, at step S1008 to go next, for the path P[3]=P1, Offset (=ET[2], the time of setup completion of P3) is assigned to the start time ST[3] of P1 and a value obtained by α×(6=the number of Hops of P1)+Offset (=ET[2], the time of setup completion of P3) is assigned to the end time ET[3] of P1.

Then, the process goes up to S1011 and back to S1016 and S1007 (Yes), for the path P[4]=P5, Offset (=ET[2], the time of setup completion of P3) is set for its start time ST[4] and a value obtained by α×(5=the number of Hops of P5)+Offset (=ET[2], the time of setup completion of P3) is set for its end time ET[4] (S1008).

At the point of time T=3, P[1]=P2 is selected as a path having next earliest timing of setup completion (S1020) and ET[1], the time of setup completion of P2 is assigned to Offset (S1021).

At step S1008 to go next, for the path P[5]=P4, Offset (=ET[1], the time of setup completion of P2) is assigned to the start time ST[5] of P4 and a value obtained by α×(6=the number of Hops of P4)+Offset (=ET[1], the time of setup completion of P2) is assigned to the end time ET[5] of P4.

Then, a path setup execution process is described with FIG. 18.

In the path setup execution process (1500 in FIG. 18), the network management server 50 first loads the path setup execution management program to the CPU 2001 and starts the program.

The network management server 50 reads in data for path setup grouped by path setup timing (S1501), as illustrated in FIG. 16.

Next, the network management server 50 selects one group of grouped paths and executes path setup. In particular, the server selects a plurality of paths with T1 described in the setup timing 407 field in FIG. 16 and executes path setup (S1502).

After the execution of setup of paths, then, the network management server 50 transmits requests to verify the quality of the set-up paths to communication devices located at starting end points of the paths (S1503).

Next, the network management server 50 decides whether or not setup of a path belonging to the group subjected to path setup execution (S1504). In particular, the server decides whether or not setup of a path whose setup is anticipated to be complete earliest is complete from a path setup completion message that the server receives.

If setup of a path whose setup is anticipated to be complete earliest is not complete, as decided at S1504 (S1504: No), the network management server 50 continues the processing step S1504.

If setup of a path whose setup is anticipated to be complete earliest is complete, as decided at S1504 (S1504: Yes), the network management server 50 decides whether or not setup of paths in all groups is complete (S1505).

If setup of paths in all groups is not complete, as decided at S1505 (S1505: No), the network management server 50 checks next setup timing (S1506) and executes S1502.

If setup of paths in all groups is complete, as decided at S1505 (S1505: Yes), the network management server 50 terminates the path setup process.

Figure 19A:
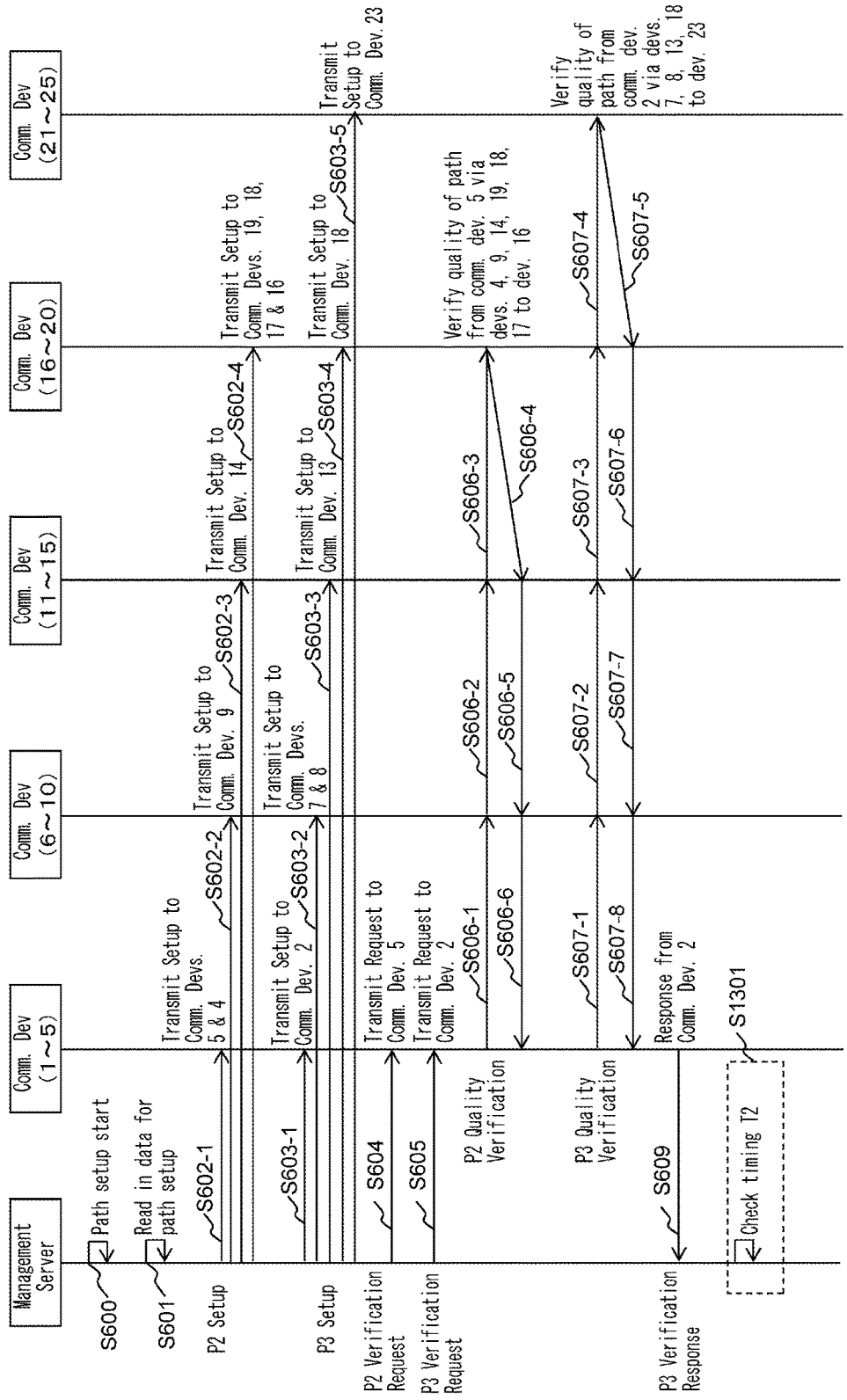
FIG. 19A is a sequence diagram illustrating a path setup process as per first timing (T1) in the second embodiment.
Figure 19C:
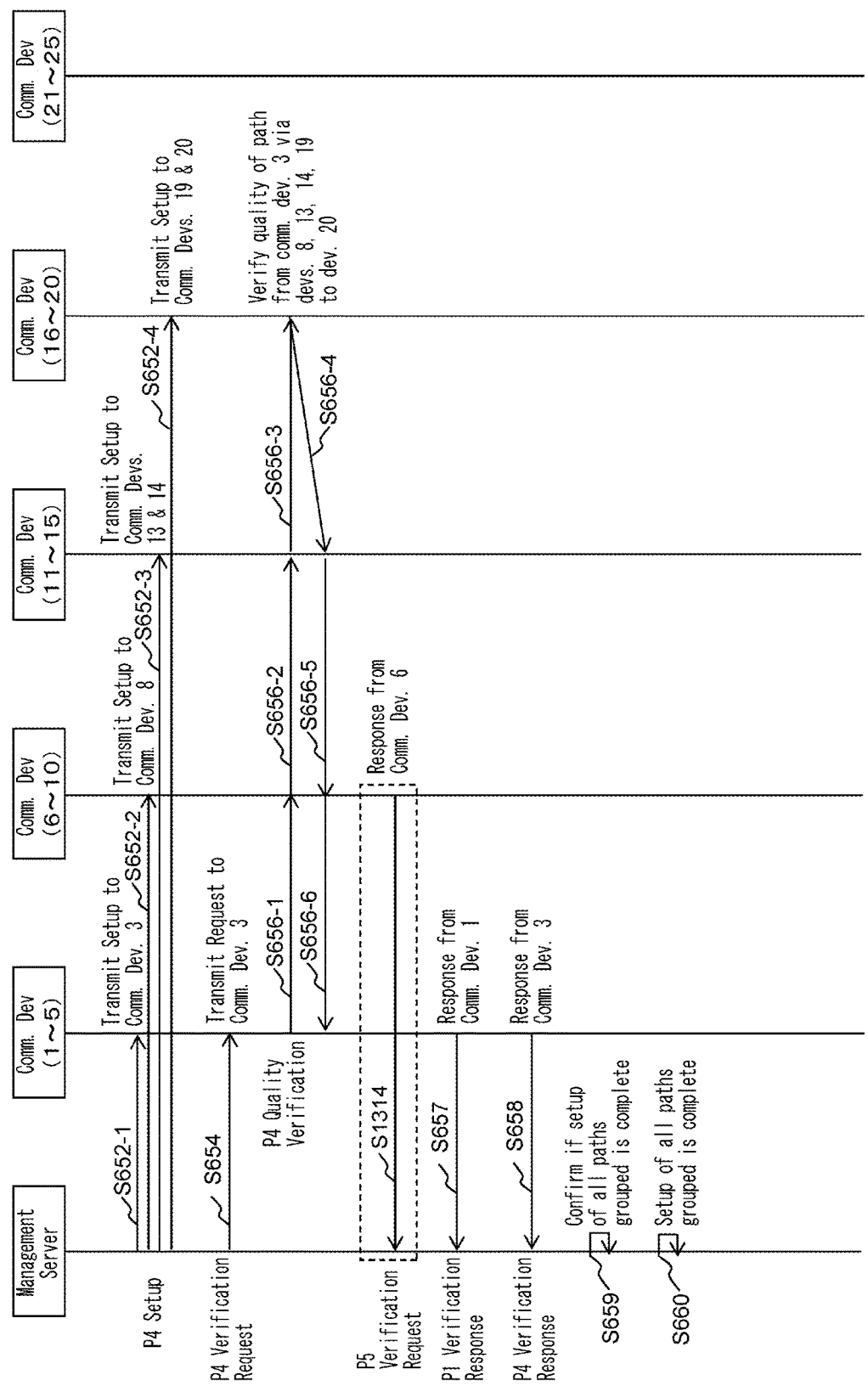
FIG. 19C is a sequence diagram illustrating a path setup process as per third timing (T3) in the second embodiment.

Then, the path setup process in the second embodiment with respect to the network model depicted FIG. 14 is explained with FIGS. 19A to 19C.

FIG. 19A is a sequence diagram illustrating a path setup process as per the first timing (T1) in the second embodiment.

FIG. 19B is a sequence diagram illustrating a path setup process as per the second timing (T2) in the second embodiment.

FIG. 19C is a sequence diagram illustrating a path setup process as per the third timing (T3) in the second embodiment.

The process (S600 to S607 and S609) illustrated in FIG. 19A is the same as the process in FIG. 13A. In setup of paths P2 and P3, a path P3 setup completion response arrives at the server earlier than a path P2 setup completion response (S609), since the number of communication devices engaged in setting up the path P3 is less and the number of communication devices that the path P3 passes through is less. When path P3 setup completion is confirmed, the network management server 50 checks setup timing T2 (S1301), as described with FIG. 16.

Upon confirming the timing T2 (S1301), described with FIG. 19A, the network management server 50 transmits a path (P1) Setup message to set up a path for data transmission from a terminal A1 (30-1) to a terminal A2 (30-2) to communication devices 1, 2, 7, 12, 17, and 22 (S651-1 to S651-5 in FIG. 19B).

Next, the network management server 50 transmits a path (P5) Setup message to set up a path for data transmission from a terminal E1 (30-9) to a terminal E2 (30-10) to communication devices 6, 7, 8, 9, and 10 (S1311).

Then, the network management server 50 transmits a request message to execute quality verification of the set-up path P1 to a communication device 1 located at an end point among the communication devices on the path P1 (S653).

Next, the network management server 50 transmits a request message to execute quality verification of the set-up path P5 to a communication device 6 located at an end point among the communication devices on the path P5 (S1312).

Then, the communication device 1 transmits data for quality verification to a communication device 22 via communication devices 2, 7, 12, and 17 and the communication device 22 transmits the received data back to the communication device 1 via the communication devices 17, 12, 7, and 2 (S655-1 to S655-8).

Next, the communication device 6 transmits data for quality verification to a communication device 10 via communication devices 7, 8, and 9 and the communication device 10 transmits the received data back to the communication device 6 via the communication devices 9, 8, and 7 (S1313).

Next, the communication device 5 judges the quality of the set-up path based on the data transmitted back by the communication device 16 and notifies the network management server 50 that the path has been set up properly (S608).

Then, when path P2 setup completion is confirmed, the network management server 50 checks setup timing T3 (S1302), as described with FIG. 16.

Upon confirming the timing T3 (S1302), described with FIG. 19B, the network management server 50 transmits a path (P4) Setup message to set up a path for data transmission from a terminal D1 (30-7) to a terminal D2 (30-8) to communication devices 3, 8, 13, 14, 19, and 20 (S652-1 to S652-4 in FIG. 19C).

Then, the network management server 50 transmits a request message to execute quality verification of the set-up path P4 to a communication device 3 located at an end point among the communication devices on the path P4 (S654).

Next, the communication device 3 transmits data for quality verification to a communication device 20 via communication devices 8, 13, 14, and 19 and the communication device 20 transmits the received data back to the communication device 3 via the communication devices 19, 14, 13, and 8 (S656-1 to S656-6).

Next, the communication device 6 judges the quality of the set-up path based on the data transmitted back by the communication device 10 and notifies the network management server 50 that the path has been set up properly (S1314).

Next, the communication device 1 judges the quality of the set-up path based on the data transmitted back by the communication device 22 and notifies the network management server 50 that the path has been set up properly (S657).

Next, the communication device 3 judges the quality of the set-up path based on the data transmitted back by the communication device 20 and notifies the network management server 50 that the path has been set up properly (S658).

Then, when setup of the paths at the third timing is complete, the network management server 50 confirms whether or not there is another path to be set up (S659).

In the present invention, there is not another path to be set up and, therefore, the network management server 50 completes path setup (S660).

As described above, at the point of time when setup of one individual path has been completed, paths that do not share a same link are grouped and setting up the paths is executed; thus, it is enabled to setup paths rapidly. Moreover, after confirming setup completion of each individual path, it begins to set up paths in a next group concurrently; thus, concurrent setup of paths can be executed reliably.

Third Embodiment

In the first embodiment, under the constraint that, for the quality verification test, it shall be impossible to set up paths sharing a same link concurrently and to verify the quality of such paths concurrently, description was provided about a method for grouping paths into units allowing path setup to be carried out concurrently in setting up paths for data transmission and performing path setup concurrently within a group.

In the present embodiment, moreover, the constraint for the quality verification test is tightened. Under the constraint that paths shall not share a node (communication device), not only a link, it shall be implemented to group paths into units allowing path setup to be carried out concurrently in setting up paths for data transmission and perform path setup concurrently within a group.

In the following, descriptions are provided, focusing on differences in comparison with the first embodiment.

With FIG. 20, first, descriptions are provided about data for path setup in the configuration of the paths depicted in FIGS. 7A to 7C regarding the first embodiment and an outline of an algorithm for path setup.

FIG. 20 is a diagram illustrating an example of a path setup management table with setup timing fixed in the third embodiment.

The path setup management table illustrated in FIG. 20 is an example of modification to that illustrated in FIG. 8D. That is, in the field of a list of paths sharing a link 406 in FIG. 8D, other paths that share a link with the path are retained; whereas, in a field of a list of paths sharing a comm. dev. 1601 in FIG. 20, other paths that share a communication device with the path are retained. For example, an entry 1611 indicates that there is one or more communication devices that the path P2 shares with any of paths, P1, P3, and P4. Subsequent entries 1612, 1613, and 1614 similarly indicate other paths that share a communication device with each path. It is also indicated that the path P2 is setup at timing T1, paths P1 and P4 are set up at timing T2, and the path P3 is set up at timing T3.

In the present embodiment, according the list of paths sharing a comm. dev. 1601, as above, timing to set up each path is determined, which is specified in the setup timing 407 field. Paths are to be grouped as a combination of paths allowed to be set up at the same timing which is specified in the setup timing filed.

Figure 21:
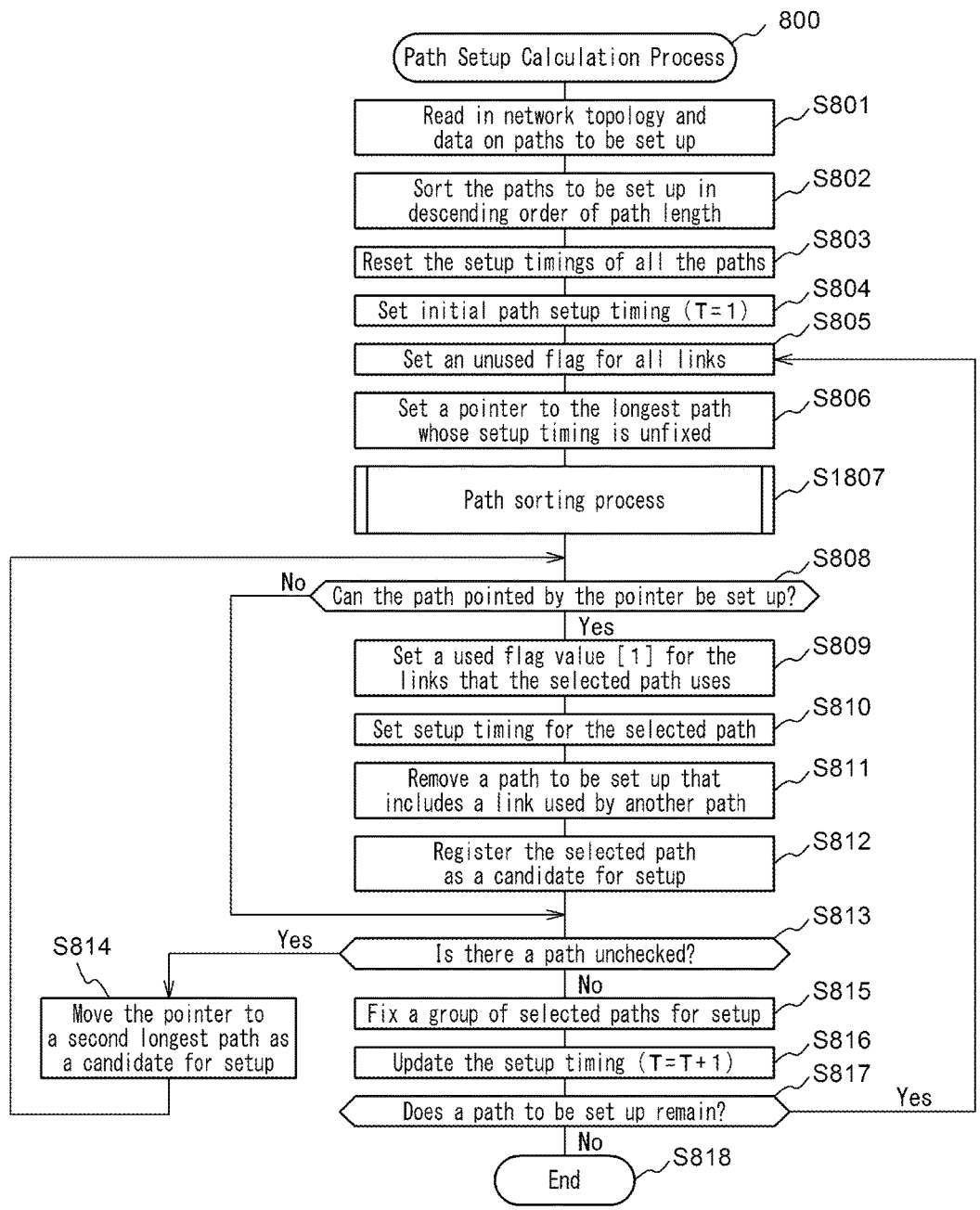
FIG. 21 is a flowchart illustrating a process according to the path setup calculation program in the third embodiment.
Figure 22:
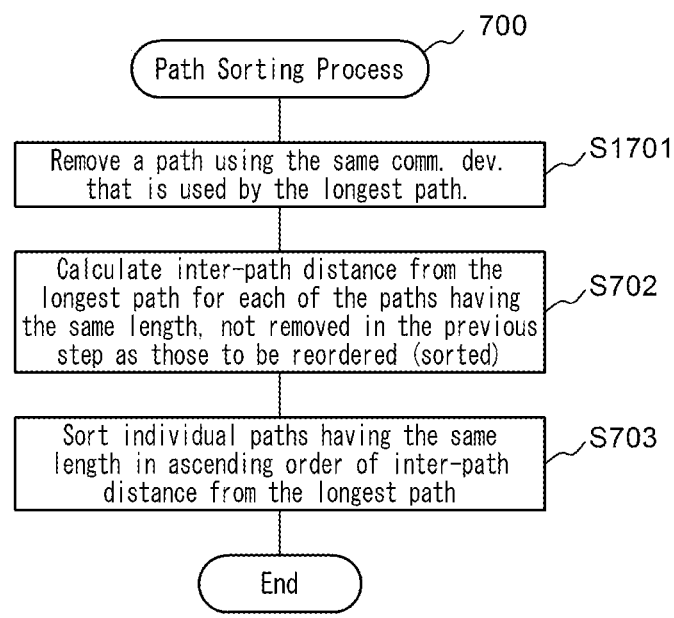
FIG. 22 is a flowchart illustrating a process according to the path sorting program in the third embodiment.

With FIGS. 21 and 22, then, a process regarding path setup in the third embodiment is described in detail.

FIG. 21 is a flowchart illustrating a process according to the path setup calculation program in the third embodiment.

FIG. 22 is a flowchart illustrating a process according to the path sorting program in the third embodiment.

The process according to the path setup calculation program illustrated in FIG. 21 regarding the present embodiment is an example of modification to the process according to the path setup calculation program illustrated in FIG. 10 regarding the first embodiment. In the process illustrated in FIG. 10, at the processing step S801, the network management server 50 executes the path sorting program by inter-path distance, which is illustrated in FIG. 11 regarding the first embodiment, based on the path setup management table illustrated in FIG. 8D.

In contrast, in the process in the present embodiment, which is illustrated in FIG. 21, at S1807, the network management server 50 executes the path sorting program by inter-path distance, which is illustrated in FIG. 11 regarding the first embodiment, based on the path setup management table, as illustrated in FIG. 20. Other processing steps S801 to S806 and S808 to S818 are the same as described previously. Then, the path soring process is described with FIG. 22. This is the process of S1807 in FIG. 21. The path sorting process illustrated in FIG. 22 is an example of modification to the path sorting process illustrated in FIG. 11. In the process illustrated in FIG. 11, it is implemented at S701 to remove a path that uses a same link that is used by the reference longest path from candidates of paths allowed to be set up concurrently. In contrast, in the process illustrated in FIG. 22, it is implemented to remove a path that uses a same communication device that is used by the reference longest path (S1701). Other processing steps S702 to S704 are the same as described previously.

Forth Embodiment

In the first and second embodiments, at the point of time when a path is set up, the server transmits a path Setup Specification message that defines a destination to transmit data to each communication device. In the present embodiment, each communication device retains in advance a path setup specification that defines a destination to transmit data embodiment in a setting change table. Descriptions are provided about a communication device capable of changing the destination to transmit data according to a change command at the point of time of actual change occurring.

In the following, the forth embodiment is described with the aid of FIG. 23.

Figure 23:
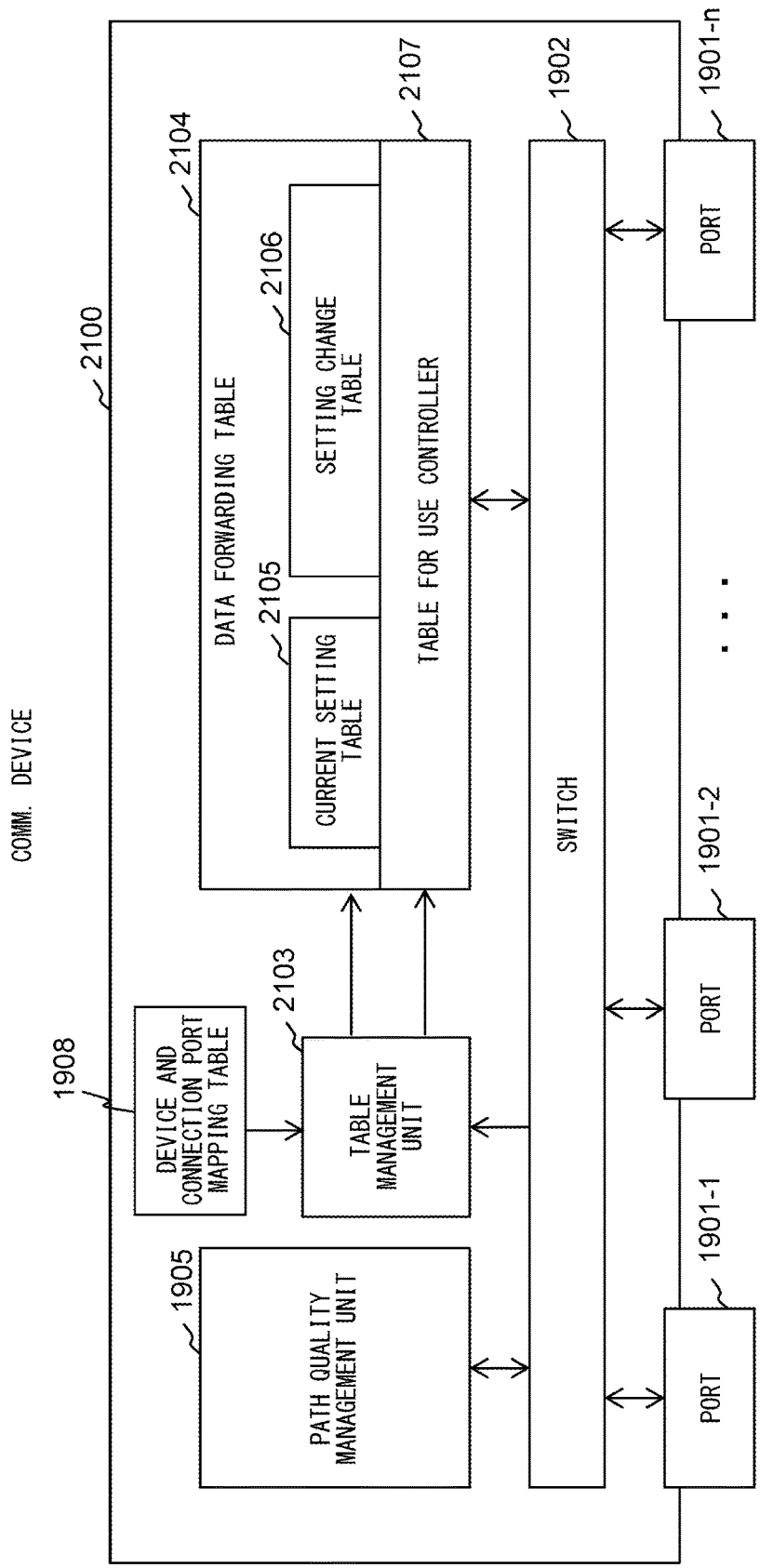
FIG. 23 is a block diagram depicting a configuration of a communication device in a fourth embodiment.

FIG. 23 is a block diagram depicting a configuration of a communication device in the fourth embodiment.

The communication device depicted in FIG. 23 is an example of modification to the communication device depicted in FIG. 2.

In the communication device 2100 of the present embodiment, a data forwarding table 2104 is comprised of a current setting table 2105 and a setting change table 2106. The current setting table 2105 is a table that is used until a change command is issued from the network management server 50. The setting change table 2106 is a table to store data for packet forwarding and this table is used when a change command has issued from the network management server 50. Network ports 1901 and a switch 1902 in the communication device 2100 in FIG. 23 have the same functions, respectively, as the corresponding ones in the communication device in FIG. 2. When data to be forwarded has been received, the switch 1902 switches the data to a network interface as an output destination which is determined according to the data forwarding table 2105. If the received data is a path setup message packet or a path setup change packet that commands the device to change path setup, the switch 1902 switches the received data to be transferred to the table management unit 2103. If a quality verification request packet regarding a transmission path has been received, switching the packet to be transferred to the path quality management unit takes place. For a communication device located at a data relay point and receiving a packet for quality verification of a transmission path, switching data to a network port 1901 as an output destination which is determined according to the current setting, data forwarding table 2105 takes place. The path quality management unit 1905, upon receiving a quality verification request packet regarding a transmission path, transmits a quality verification request packet to verify the path quality toward a communication device located at the other end point of the path. For a communication device located at a terminating end point of a path and receiving a packet for quality verification of a transmission path, its switch 1902 transfers data to the path quality management unit 1905. The path quality management unit 1905 transmits the received packet back to the source via the switch 1902. The table management unit 2103 stores and retains the received path setup packet in the setting change table 2106. Also, the table management unit 2103, upon receiving a path setup change packet, rewrites data for data forwarding 2105 in the current setting table with data 2106 in the setting change table via a table for use controller 2107.

As described above, in the present embodiment, data for path setup is distributed in advance to the communication devices and a change command is transmitted from the network management server to the respective communication devices at the point of time of path setup change occurring; thus, setup can be changed rapidly.

Fifth Embodiment

In the first through third embodiments, description was provided about an embodiment in which reordering paths in descending order of path length is performed for all paths. In the this embodiment, paths are categorized by bandwidth of a path to be set up and it is implemented to group paths and set up paths concurrently, described in the foregoing first embodiment.

In the following, the forth embodiment is described with FIGS. 24A and 24B.

FIG. 24A is a diagram illustrating a table of sorting paths by category before sorting.

FIG. 24B is a diagram illustrating the table of sorting paths by category after sorting.

As illustrated in FIG. 24A, the table of sorting paths by category is comprised of the following fields of: a path identifier 2201 to identify a path, set bandwidth 2202 indicating bandwidth that is set, and category 2203 indicating a categorized group. The table of sorting paths by category illustrates that all paths to be set up (entries 2211 to 2217) are managed such that a path for which 10 Gbits/s is specified in the set bandwidth 2202 field belongs to category A, while a path for which 1 Gbit/s is specified in the set bandwidth 2202 field belongs to category B.

In the present embodiment, according to the category 2203 specified in FIG. 24A, reordering (sorting) paths belonging to the same category is performed according to the category 2203, as illustrated in FIG. 24B. In the present embodiment, the path setup process is performed preferentially for paths for which a wider bandwidth is set and grouping paths and setting up paths concurrently, described in the foregoing embodiments, are first executed for reordered paths belonging to category A. Besides, after determining setup timing of the reordered paths belonging to category A, grouping paths and setting up paths concurrently, described in the foregoing embodiments, are executed for reordered paths belonging to category B.

As described above, in the present embodiment, paths for which a wider bandwidth is set in the set bandwidth field are preferentially set up concurrently; thus, it is enabled to early establish data transmission paths having a large capacity from a perspective of data transmission amount and large capacity data transmission, thus enabled early, can lead to making effective use of the network.

Although the present disclosure has been described with reference to exemplary embodiments, those skilled in the art will recognize that various changes and modifications may be made in form and detail without departing from the spirit and scope of the claimed subject matter.

What is claimed is:

1. A network system of a network including communication devices as nodes and connection paths between the communication devices as links, the network system comprising:

a network management device connected to the communication devices that transmits a path setup message for a path across devices to be interconnected to the communication devices, wherein:

the network management device retains path information of the path as a list of node identifying information to identify nodes;

the path information including information on paths sharing a link with regard to a relation in which one path shares a link with another path;

the network management device retains path setup timing with respect to each path;

according to the information on paths sharing a link, the network management device determines a first path setup timing for a path to be the same for a group of one or more paths that do not share a same link with the path and determines a different path setup timing for a group of one or more paths that share a same link with the path; and the network management device executes path setup via the communication devices existing on paths constituting each group of paths as per the respective path setup timing determined for each group, wherein timing when setup of paths belonging to a first group has been completed is taken as setup timing of paths belonging to a second group and wherein the time of timing when setup of the paths has been completed is obtained by getting the sum of time specified as path setup timing for the paths and a value obtained by multiplying the number of nodes on each of the paths by a coefficient.

2. The network system according to claim 1, wherein a group of paths is determined such that a path is determined to belong to the group in descending order of the number of nodes belonging to each path.

3. The network system according to claim 1, wherein the network management device calculates inter-path distance between paths and determines a path to belong to the same group in ascending order of the inter-path distance.

4. The network system according to claim 3, wherein inter-path distance between a first path and a second path is a value obtained by:

counting the number of intra-network nodes to pass through from a node on the first path to reach the nearest node on the second path with respect to each node on the first path; and summing up the numbers of nodes counted for all nodes on the first path.

5. The network system according to claim 1, wherein, additionally, paths that share a node with another path are sorted as another group.

6. The network system according to claim 1, wherein paths are categorized by communication bandwidth of their paths and different setup timings are determined for different categories.

* * * * *